(12) United States Patent
Toyoda et al.

(10) Patent No.: US 9,096,003 B2
(45) Date of Patent: Aug. 4, 2015

(54) LAMINATED SYNTHETIC RESIN BOTTLE, INJECTION MOLDING DEVICE, AND PROCESS FOR MOLDING A LAMINATED PREFORM

(71) Applicants: Tamotsu Toyoda, Tokyo (JP); Hiroshi Hosokoshiyama, Tokyo (JP); Yasuhiro Ishizawa, Tochigi (JP); Hideaki Soyama, Chiba (JP)

(72) Inventors: Tamotsu Toyoda, Tokyo (JP); Hiroshi Hosokoshiyama, Tokyo (JP); Yasuhiro Ishizawa, Tochigi (JP); Hideaki Soyama, Chiba (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 154 days.

(21) Appl. No.: 14/057,244

(22) Filed: Oct. 18, 2013

(65) Prior Publication Data

US 2014/0091492 A1    Apr. 3, 2014

Related U.S. Application Data

(62) Division of application No. 13/001,212, filed as application No. PCT/JP2009/061820 on Jun. 29, 2009, now Pat. No. 8,607,999.

(30) Foreign Application Priority Data

Jun. 30, 2008  (JP) ................................. 2008-171868
Jun. 30, 2008  (JP) ................................. 2008-171870

(51) Int. Cl.
  *B29C 45/16*    (2006.01)
  *B29B 11/14*    (2006.01)
  (Continued)

(52) U.S. Cl.
  CPC ............ *B29C 45/1646* (2013.01); *B29B 11/14* (2013.01); *B29C 45/1603* (2013.01);
  (Continued)

(58) Field of Classification Search
  CPC  B29C 45/1646; B29C 45/1643; B29C 45/22; B29C 49/221; B29C 2045/1648; B29C 2045/165
  See application file for complete search history.

(56) References Cited

U.S. PATENT DOCUMENTS 4,994,313 A    2/1991   Shimizu et al.
6,341,712 B1   1/2002   Huang
(Continued)

FOREIGN PATENT DOCUMENTS

JP    A-1-254539    10/1989
JP    03-76624    *  4/1991
(Continued)

OTHER PUBLICATIONS

International Search Report for International Patent Application No. PCT/JP2009/061820, mailed on Oct. 6, 2009 (w/ English translation).
(Continued)

*Primary Examiner* — Jill Heitbrink
(74) *Attorney, Agent, or Firm* — Oliff PLC

(57) ABSTRACT

A problem to be solved by this invention is to control the above-described problem of delamination in the laminated and biaxially drawn, blow molded bottle. A major means of this invention to solve this problem is a biaxially drawn, blow molded bottle characterized in that vertical connecting zones having no intermediate layer and having substrate layers welded directly with each other are formed in parallel in a circumferential direction and in a plural number along an axial direction of the bottle and are disposed on both right and left sides of each intermediate layer segment to be formed in this height range, and that horizontal connecting zones having no intermediate layer and having substrate layers welded directly with each other are also formed in parallel in an axial direction and in a plural number along a circumferential direction of the bottle and are disposed on both upper and lower sides of each intermediate layer segment to be formed, thus allowing the intermediate layer to be segmentalized in the circumferential and axial directions by both the vertical and horizontal connecting zones.

20 Claims, 17 Drawing Sheets

(51) Int. Cl.
    B29C 49/22     (2006.01)
    B65D 1/02      (2006.01)
    B29C 49/00     (2006.01)
    B29C 45/22     (2006.01)
    B29B 11/08         (2006.01)
    B29C 49/06         (2006.01)
    B29K 67/00         (2006.01)
    B29K 77/00         (2006.01)
    B29K 105/00        (2006.01)

(52) U.S. Cl.
    CPC ............. *B29C45/1684* (2013.01); *B29C 45/22* (2013.01); *B29C 49/0073* (2013.01); *B29C 49/221* (2013.01); *B65D 1/0215* (2013.01); *B29B 11/08* (2013.01); *B29B 2911/141* (2013.01); *B29B 2911/1402* (2013.01); *B29B 2911/1404* (2013.01); *B29B 2911/1406* (2013.01); *B29B 2911/1408* (2013.01); *B29B 2911/1412* (2013.01); *B29B 2911/14026* (2013.01); *B29B 2911/14066* (2013.01); *B29B 2911/14126* (2013.01); *B29B 2911/14146* (2013.01); *B29B 2911/14153* (2013.01); *B29B 2911/14326* (2013.01); *B29B 2911/14333* (2013.01); *B29B 2911/14446* (2013.01); *B29B 2911/14466* (2013.01); *B29C 45/1642* (2013.01); *B29C 45/1657* (2013.01); *B29C 49/06* (2013.01); *B29C 2045/165* (2013.01); *B29C 2045/1648* (2013.01); *B29C 2045/1668* (2013.01); *B29C 2049/222* (2013.01); *B29K 2067/043* (2013.01); *B29K 2067/046* (2013.01); *B29K 2077/00* (2013.01); *B29K 2105/258* (2013.01); *B29K 2667/043* (2013.01); *B29K 2995/0067* (2013.01)

(56) References Cited

U.S. PATENT DOCUMENTS

| 2004/0079754 | A1  | 4/2004  | Schutz |
| 2008/0317989 | A1* | 12/2008 | Abe et al. ..................... 428/36.9 |
| 2011/0155686 | A1* | 6/2011  | Maki et al. ..................... 215/40 |

FOREIGN PATENT DOCUMENTS

| JP | A-5-193636    | 8/1993  |
| JP | A-5-309648    | 11/1993 |
| JP | A-2007-223628 | 9/2007  |

OTHER PUBLICATIONS

International Preliminary Report on Patentability for International Patent Application No. PCT/JP2009/061820, mailed on Feb. 8, 2011.

\* cited by examiner

Fig.9
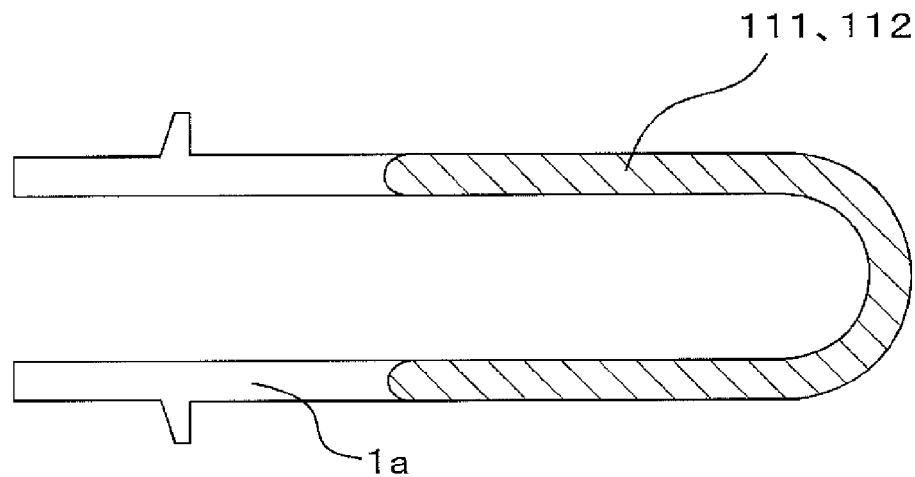
(a) at just before point E
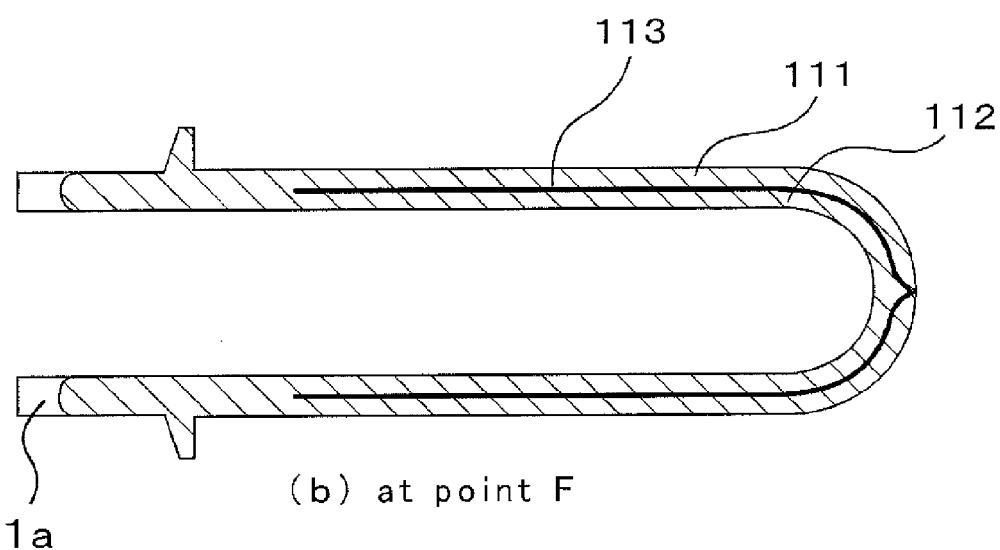
(b) at point F
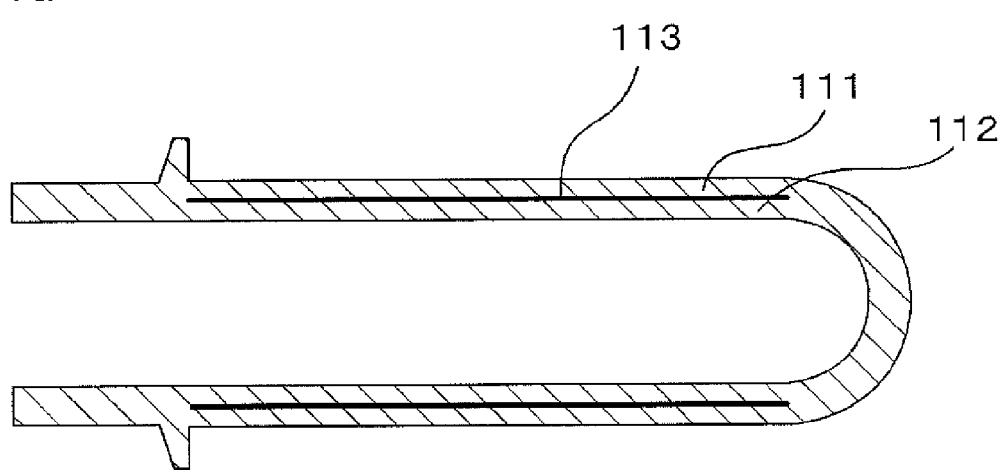
(c) at point D (a) at just before point E (b) at point F (c) at poit D

LAMINATED SYNTHETIC RESIN BOTTLE, INJECTION MOLDING DEVICE, AND PROCESS FOR MOLDING A LAMINATED PREFORM This is a Divisional of application Ser. No. 13/001,212 filed Dec. 23, 2010, which is the National Stage of PCT/JP2009/061820 filed on Jun. 29, 2009, and claims the benefit of Japanese Patents No. 2008-171870 filed Jun. 30, 2008 and No. 2008-171868 filed Jun. 30, 2008. The disclosure of the prior applications is hereby incorporated by reference herein in its entirety.

TECHNICAL FIELD

This invention relates to a laminated synthetic resin bottle, which has an intermediate layer laminated with a main resin and which is made by biaxial drawing and blow molding, a process for molding a laminated preform which is a primary molded product for the bottle, and an injection molding device used to mold this preform.

BACKGROUND ART

The biaxially drawn and blow molded bottles made of such a resin as polyethylene terephthalate (hereinafter referred to as PET) are now in use in various fields including beverages, foods, and cosmetics. Especially in those fields requiring a gas barrier property, use is made of laminated bottles in which an intermediate gas barrier layer of a nylon resin or a copolymeric resin of ethylene vinyl alcohol is laminated with layers of the main PET resin.

Patent document 1 discloses a biaxially drawn and blow molded bottle in which a layer of such a gas barrier resin has been laminated with the layers of the PET resin, and a process for molding a laminated preform in a shape of a test tube, which is a primary molded product used to mold the laminated bottle. FIGS. 20 and 21 show representative examples of such a bottle and a preform. The bottle 601 shown in FIG. 20 comprises a neck 602, a neck ring 603, a cylindrical body 605, and a bottom 606. In a height range excluding an upper portion of the neck 602 and the bottom 606, an intermediate layer 613 of the nylon resin having a gas barrier property is sandwiched between an outer layer 611 and an inner layer 612 both made of the PET resin.

The bottle 601 can be molded by biaxially drawing and blow molding the preform 501 shown in FIG. 21. This preform 501 comprises a neck 502, a neck ring 503, a cylindrical body 505, and a bottom 506. At a height range excluding the neck 502 and the bottom 506, an intermediate layer 513 of the nylon resin having a gas barrier property is sandwiched between an outer layer 511 and an inner layer 512 both made of the PET resin.

A DOCUMENT OF CONVENTIONAL ART

Patent Document

Patent document 1: Published patent application JP1989-254539

DISCLOSURE OF THE INVENTION

Problems to be Solved by the Invention

In the case of the biaxially drawn, blow molded bottle having a gas barrier resin, such as a nylon resin, laminated with the layers of the main PET resin material, the PET resin layers are in tight contact with the layer of the gas barrier resin, but they are not adhered to each other. If the bottle is filled with a carbonated beverage, and thus, if the inside is put under a pressurized condition, the bottle has no problem as long as the inside is under pressure before use. However, in the moment when the cap is removed, both types of layers may happen to be peeled from each other because of the action of large shearing force caused by a rapid change in pressure. Once both types of layers have been peeled, they never come in tight contact again. Since light scatters or reflects at the peeled interface, the peeling can be observed from outside. Therefore, there occurs a problem of impaired outer appearance. In addition, during a shrinking process after the biaxially drawing and blow molding, a delamination problem may also occur due to a difference in the ratio of shrinkage between the intermediate layer and the outer or inner layer.

A problem to be solved by this invention is to control the above-described problem of delamination in the laminated and biaxially drawn, blow molded bottle. Objects of this invention are to provide a laminated synthetic resin bottle effectively protected against delamination, to provide a process for molding a laminated preform which is used to mold this laminated bottle, and to provide an injection molding device to be used to mold the laminated preform.

Means of Solving the Problems

Regarding the laminated and biaxially drawn, blow molded synthetic resin bottle, the process for molding a laminated preform used to mold this laminated bottle, and the injection molding device used to mold the laminated preform, description will be made below in the order of the laminated synthetic resin bottle, the injection molding device, and the process for molding the laminated preform. Among the features of this invention that has been made to solve the above-described technical problems, a main feature associated with the laminated synthetic resin bottle is a bottle obtained by biaxially drawing and blow molding a laminated synthetic resin preform in the shape of a test tube, in which substrate layers of the main resin have been laminated with at least an intermediate layer. The intermediate layer is laminated with the substrate layers over a predetermined height range, but narrow vertical connecting zones having no intermediate layer and having the substrate layers welded directly with each other are formed in parallel in a circumferential direction and in a plural number along an axial direction of the bottle, and are disposed on both right and left sides of each intermediate layer segment to be formed, thus allowing the intermediate layer to be segmentalized in the circumferential direction by these vertical connecting zones.

According to the above-described feature, the intermediate layer is segmentalized in the circumferential direction by the vertical connecting zones having the substrate layers welded directly with each other, and two vertical connecting zones are disposed on both the right and left sides of each neighboring intermediate layer segment. At that time, when the shearing force acts on the interface between the intermediate layer and the substrate layers, the force would act only under a condition that both right and left sides of each intermediate layer segment are restricted by the vertical connecting zones. Because of this restriction, the delamination between layers is effectively prevented from occurring.

The laminated layers comprising the substrate layers and the intermediate layer or layers can be varied in their laminate structures, including, for example, 2 resins-3 layers (a substrate-an intermediate-a substrate), 2 resins-5 layers (a substrate-an intermediate-a substrate R-an intermediate-a substrate), 3 resins-4 layers (a substrate-a substrate A-an intermediate B-a substrate), 3 resins-4 layers (a substrate-a substrate R-an intermediate-a substrate), 3 resins-5 layers (a substrate-an intermediate A-a substrate-an intermediate B-a substrate), and 3 resins-5 layers (a substrate-an intermediate-a substrate R-an intermediate-a substrate). Even in a case where more than one intermediate layer is formed, these intermediate layers can also be segmentalized in the circumferential direction by the vertical connecting zones having the substrate layers directly joined and welded, because these vertical connecting zones are formed similarly in parallel in the circumferential direction and in a plural number along the axial direction of the bottle, and are disposed on both the right and left sides of each intermediate layer segment to be formed. In the above description, the intermediate layer A and the intermediate layer B are shown to be made of different resins, and the substrate R indicates that it is the layer made of a recycled main resin product.

In addition to the main feature described above, another feature of this invention associated with the laminated synthetic resin bottle is that not only the vertical connecting zones are extended over a predetermined height range, but that narrow horizontal connecting zones having no intermediate layer and having the substrate layers are welded directly with each other are formed in parallel in the axial direction and in a plural number along the circumferential direction of the bottle, and are disposed on both upper and lower sides of each intermediate layer segment to be formed, to divide the intermediate layer laterally. Thus, the intermediate layer is segmentalized in a lattice pattern in the circumferential and axial directions by both the vertical and horizontal connecting zones Because of the above feature, the intermediate layer is divided vertically and horizontally into segments by the vertical and horizontal connecting zones having the main resin substrates joined and welded together. The shearing force acting on the interface between the substrate layers and the intermediate layer should be restricted along the right and left edges by the vertical connecting zones, and in addition, along the upper and lower edges by the horizontal connecting zones. Due to this lattice pattern, the delamination between layers, as caused by the change in pressure inside the bottle, can be effectively prevented from occurring.

In addition to the above features, still another feature of this invention associated with the laminated synthetic resin bottle is that a body portion, except for the neck and the bottom, is included in the predetermined height range.

Measurement values on the bottle formation include the height range over which the intermediate layer is laminated, and the number and/or width of the vertical or horizontal connecting zones. These values can be determined properly by taking into account the purpose of bottle use, the functions of the intermediate layer, such as the gas barrier property, and moldability (or productivity) of preforms or bottles manufactured by using the preforms as the primary molded products. The intermediate layer can be laminated over the entire height range of the bottle. However, the neck is a portion which is not drawn in the biaxial drawing and blow molding, and the bottom is a portion which is not fully drawn. These portions tend to be deformed by laminating the intermediate layer. Unless the intermediate layer is laminated in the neck and bottom portions, then problems of damaged sealing property of the neck fitted with a cap or damaged uprightness of the bottom can be effectively controlled.

In addition to the above features, still another feature associated with the laminated synthetic resin bottle is that the laminated layers comprises main resin layers and an intermediate layer of a gas barrier resin and have a laminate structure of 2 resins and 3 layers.

The above feature is intended to increase the gas barrier property of the bottle by using a gas barrier resin as the intermediate layer. Typical layer structure includes, for example, PET/a nylon resin, such as MXD-6/PET, PET/EVOH/PET, PP/EVOH/PP, and PLA/PGA/PLA where EVOH is an ethylene vinyl alcohol copolymer; PP, a polypropylene resin; PLA, polylactic acid; and PGA, polyglycolic acid.

For the purpose of further improving the barrier property of the intermediate layer made of a gas barrier resin, an oxygen scavenger or an oxygen absorber can be mixed with or scattered in the gas barrier resin. It is also possible to scatter a lamellar silicate in the MXD-6 nylon resin to produce a nano composite material. The intermediate layer of a cyclic polyolefin resin is effective as a barrier resin against water.

A main feature of this invention associated with the injection molding device is that an injection molding device is used to injection mold a laminated preform in a test-tube shape, which is biaxially drawn and blow molded into the bottle and which comprises substrate layers of a main resin and at least an intermediate layer. This injection molding device comprises two resin feeders to feed the main resin and the intermediate-layer resin, a multi-nozzle section in which to laminate the main resin with the intermediate-layer resin, and a mold for molding the preform. The multi-nozzle section comprises at least three layer-forming flow channels: cylindrical inner and outer flow channels to form the substrate layers of the main resin and a cylindrical middle flow channel located between the inner flow channel and the outer flow channel to form the intermediate layer from an intermediate-layer resin. Downstream of at least three layer-forming flow channels, a joined flow channel is disposed by way of a confluence where molten resins join after having flowed through respective layer-forming flow channels. At some points ranging from a given position along the middle flow channel, through which the intermediate-layer resin flows, to the confluence, a plural number of vertical blocking rib pieces are disposed in parallel in the circumferential direction so as to cross the middle flow channel. These vertical blocking rib pieces divide the flow through the middle channel into multiple streams along the circumferential direction.

According to the injection molding device having the above-described feature, the cylindrical intermediate-layer resin flowing through this middle flow channel can be segmentalized in the circumferential direction, by a plural number of vertical blocking rib pieces disposed in parallel in the circumferential direction and at some points ranging from a given position along the middle flow channel to the confluence. The intermediate layer can be laminated with the substrate layers under a circumferentially segmentalized condition. After the intermediate layer has been segmentalized, the two layers of the main resin having flowed through the inner and outer flow channels are joined and welded together to form the vertical connecting zones.

The above feature of the injection molding device enables the intermediate layer to be sandwiched by the substrate layers on both surfaces of the intermediate layer. The laminated preform can also have other laminate structures, such as 2 resins-3 layers, 2 resins-5 layers, 3 resins-4 layers, or 3 resins-5 layers, by adding another suitable feeder or more cylindrical flow channels to the multi-nozzle section.

A main feature of this invention associated with the process for molding the laminated preform is a process utilizing a injection molding device to mold a laminated preform in the shape of a test tube for use in the biaxial drawing and blow molding. The laminated preform to be molded has substrate layers and an intermediate layer laminated with the substrate layers in a predetermined height range. In addition, narrow vertical connecting zones having no intermediate layer and having the substrate layers joined and welded directly with each other are formed in parallel in the circumferential direction and in a plural number along the axial direction of the bottle, and are disposed on both the right and left sides of each of the intermediate layer segments to be formed. Thus, the intermediate layer is segmentalized by the vertical connecting zones in the circumferential direction. The injection molding device used in this process has a multi-nozzle section which laminates the substrate layers made of a main resin with the intermediate layer made of an intermediate-layer resin. The nozzle section is provided with cylindrical flow channels through which the main resin is flowed for a predetermined time span to form the substrate layers, and with a cylindrical flow channel through which an intermediate-layer resin coming from another feeder is flowed concurrently for a certain limited time during this predetermined time span to form the intermediate layer. The intermediate-layer resin is segmentalized in the latter flow channel in the circumferential direction, and this segmentalized resin joins the main resin at the confluence in a manner that the intermediate-layer resin is sandwiched between the substrate layers of the main resin. The mold cavity is filled with this laminated molten resin fluid.

According to the above-described molding process, the intermediate-layer resin is segmentalized in the circumferential direction inside the cylindrical flow channel used to form the intermediate layer. The circumferentially segmentalized intermediate layer is then laminated between the substrate layers. In those portions having no intermediate layer as a result of segmentalization, both substrate layers are welded together. Thus, it is possible for the laminated and injection molded preform to have the vertical connecting zones made of welded substrate layers and formed in the axial direction. The laminated synthetic resin bottle can be obtained by biaxially drawing and blow molding this laminated preform having the intermediate layer segmentalized in the circumferential direction by the vertical connecting zones of this invention.

According to the main feature associated with the molding process, the laminated preform has vertical connecting zones in the given height range. In addition, another feature of this invention associated with the molding process is that narrow horizontal connecting zones having no intermediate layer and having the substrate layers welded directly with each other are formed in parallel in the axial direction and in a plural number along the circumferential direction of the prefrom, and are disposed along the upper and lower sides of each intermediate layer segment to be formed, thus allowing the intermediate layer to be segmentalized by both the vertical and horizontal connecting zones in the circumferential direction and in the axial direction. The intermediate-layer resin is supplied to the cylindrical middle flow channel intermittently from another feeder for a certain limited time within a predetermined time span to form the horizontally segmentalized intermediate layer.

With the cylindrical middle flow channel being supplied with the intermediate-layer resin intermittently but simultaneously from another feeder for a certain period of time within a predetermined time span, the above molding process enables the separately flowed main resin to be laminated directly with each other in the circumferential direction during the time zones when the supplies of the intermediate-layer resin have been discontinued. As a result, the injection-molded laminated preform is provided with horizontal connecting zones formed in parallel in the axial direction and disposed in a number corresponding to the frequency of discontinuation.

Thus, there can be molded the laminated preform in a laminate structure wherein the horizontal and vertical connecting zones having the substrate layers directly welded are formed over a given height range in parallel in the circumferential and axial directions and wherein the intermediate layer is segmentalized vertically and horizontally by both the vertical and horizontal connecting zones.

The laminated bottle can be obtained by biaxially drawing and blow molding such a laminated preform. Corresponding to the laminate structure of the intermediate layer of this laminated preform, the bottle has the intermediate layer segmentalized by a plural number of the horizontal and vertical connecting zones having the substrate layers joined and welded with each other are formed in the circumferential direction and in the axial direction over a predetermined height range.

Still another feature of the process for molding the laminated preform of this invention is that the injection molding device of this invention described above is utilized according to the main feature of the process for molding the laminated preform of this invention. The main resin coming from a feeder to form substrate layers are supplied to the inner flow channel and the outer flow channel. The intermediate resin coming from another feeder to form the intermediate layer is supplied to the middle flow channel. The intermediate-layer resin is segmentalized in the circumferential direction by vertical blocking rib pieces existing inside the middle flow channel. At the confluence, the intermediate-layer resin under the circumferentially segmentalized condition is flowed between the main resin flows coming respectively from the inner and outer flow channels so that a laminated molten resin fluid is formed at the confluence.

According to the above molding process, the cylindrical intermediate-layer resin flowing through the middle flow channel can be segmentalized circumferentially, and the segmentalized intermediate layer can be laminated between two substrate layers, by using a plural number of vertical blocking rib pieces, which are formed in parallel in the circumferential direction of the middle flow channel, and are disposed at some point along the way ranging from a predetermined position of the middle flow channel to the confluence inside the multi-nozzle section of the injection molding device to be used. The laminated preform to be injection molded has a segmentalized intermediate layer, and in portions where there is no intermediate layer, the substrate layers are directly joined and welded together. The vertical connecting zones are thus formed in parallel in the circumferential direction, and are disposed along the axial direction in a plural number corresponding to the number of the vertical blocking rib pieces. The synthetic resin laminated bottle can be obtained by biaxially drawing and blow molding this laminated preform in which the intermediate layer has been segmentalized in the circumferential direction by the vertical connecting zones.

Still another feature of the process for molding the laminated preform of this invention is that the main resin that forms the substrate layers is supplied from a feeder to the inner and outer flow channels at a given pressure or velocity for a predetermined time span while the intermediate-layer resin is simultaneously supplied from another feeder to the middle flow channel for a certain limited time within the predetermined time span to form the intermediate layer.

This process of supplying the main resin to the inner and outer flow channels for a predetermined time span and simultaneously supplying the intermediate-layer resin from another feeder to the middle flow channel for a certain limited time within the predetermined time span is a so-called simultaneous injection process. The intermediate layer can be laminated over a predetermined height range of the preform by appropriately setting the time to start the supply of the intermediate-layer resin to the middle flow channel and the time to stop the supply.

Still another feature of the process for molding the laminated preform of this invention is that the predetermined height range covers a body portion excluding the neck and the bottom.

Measurement aspects of forming the intermediate layer, such as the height range for laminating the intermediate layer, the numbers and width of the vertical and/or horizontal connecting zones, etc., can be arbitrarily determined, taking into account the purpose of bottle use, the function of the intermediate layer such as a gas barrier property, and/or moldability and productivity of the preform and of the bottle made from this preform. The intermediate layer may also be laminated over all the height range of the bottle. The preform neck is a portion never drawn during the biaxial drawing and blow molding operation, and the bottom is a portion not fully drawn. Problems of the low capacity of seal with a cap caused by a deformed neck and a low standing function caused by bottom deformation can be effectively prevented in the biaxially drawn, blow molded bottom made from this preform, by not laminating the intermediate layer in the neck and bottom portions of the preform.

Still another feature of the process for molding the laminated preform of this invention is that the preform has a laminate structure of two resins and three layers comprising a main resin and a gas barrier resin that forms the intermediate layer.

The above feature is intended to give the bottle an improved gas barrier property. Typically, the layer structure includes, for example, PET/MXD-6 or another nylon resin/PET, PET/EVOH/PET, PP/EVOH/PP, and PLA/PGA/PLA, where EVOH is an ethylene vinyl alcohol copolymer, PP is a polypropylene resin, PLA is polylactic acid, and PGA is polyglycolic acid.

For the purpose of further improving the barrier property of the intermediate layer made of a gas barrier resin, an oxygen scavenger or an oxygen absorber can be mixed with or scattered in the gas barrier resin. It is also possible to scatter a lamellar silicate in the MXD-6 nylon resin to produce a nano composite material. The intermediate layer of a cyclic polyolefin resin is effective as a barrier resin against water.

Effects of the Invention

This invention having the above-described features has the following effects:

According to the features of the invention associated with a biaxially drawn, blow molded bottle of this invention, the intermediate layer is segmentalized in the circumferential direction by the vertical connecting zones in which the substrate layers are joined and welded together, or segmentalized by both the vertical and horizontal connecting zones in the circumferential direction and in the axial direction. Because of this segmentalization, the shearing force acts on the interfaces between the intermediate layer and the substrate layers under a condition that each segment of the intermediate layer is tied down by the vertical connecting zones on the right and left sides and by both the vertical and horizontal connecting zones on the upper and lower sides as well as on the right and left sides. Thus, the delamination caused by molding shrinkage or pressure changes inside the bottle can be effectively prevented from occurring.

According to the features of the invention associated with the injection molding device of this invention, the intermediate-layer resin flows through the middle flow channel, and at some points ranging from a given position along the middle flow channel to the confluence, a plural number of vertical blocking rib pieces are disposed in parallel in the circumferential direction. These vertical blocking rib pieces divide the cylindrical intermediate-layer resin flowing through the middle channel into multiple streams separated in the circumferential direction. The intermediate layer in the circumferentially segmentalized state can be laminated between the substrate layers. Meanwhile, in the portions sandwiched between the separated streams of the intermediate-layer resin, the two substrate layers of main resin coming from the inner and outer flow channels are directly joined and thermally welded.

According to the features of the invention associated with the process for molding the laminated preform of this invention, the intermediate layer is segmentalized in the circumferential direction in a cylindrical flow channel through which the intermediate-layer resin flows. The circumferentially segmentalized intermediate layer is then laminated between inner and outer substrate layers. In those portions having no intermediate layer as a result of segmentalization, both inner and outer substrate layers are directly welded together. Vertical connecting zones derived from welded substrate layers can be formed in parallel in the circumferential direction and disposed in a plural number along the axial direction of the laminated preform that has been injection molded. Furthermore, by supplying the cylindrical middle flow channel with the intermediate-layer resin intermittently but simultaneously from another feeder, the separately flowed main resin layers can be directly welded at the confluence in the circumferential direction during the time zones when the supplies of the intermediate-layer resin have been discontinued. As a result, the injection-molded and laminated preform is provided with a plural number of horizontal connecting zones in which the substrate layers have been welded together. The horizontal connecting zones are formed in parallel in the circumferential direction and in the axial direction in a plural number corresponding to the frequency of discontinuation.

BRIEF DESCRIPTION OF THE DRAWINGS

FIG. 9 is explanatory diagrams showing a manner in which the mold cavity is filled with molten resins in the injection pattern of FIG. 8.

FIG. 10(*b*), a vertical section showing a pattern of the intermediate layer laminated in the axial direction.

PREFERRED EMBODIMENTS OF THE INVENTION

Figure 1:
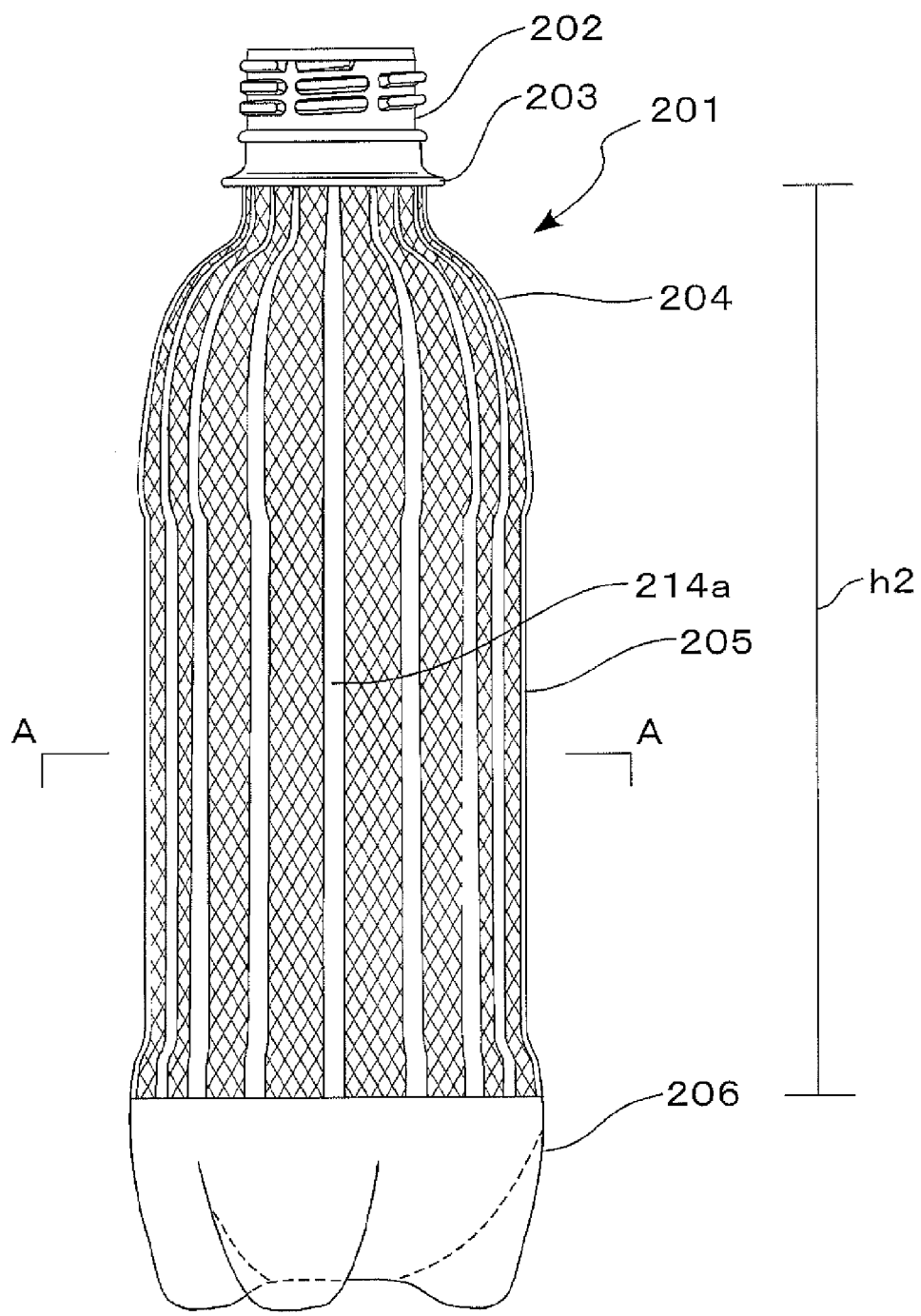
FIG. 1 is a front view of the bottle in the first embodiment of this invention.
Figure 2:
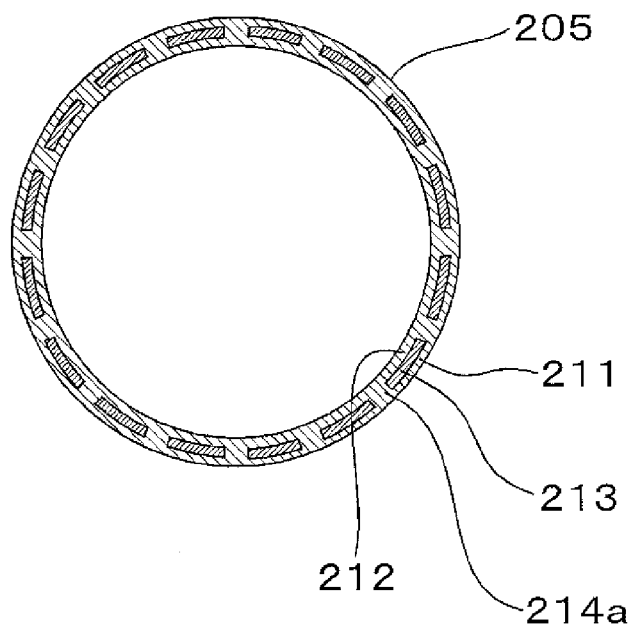
FIG. 2 is a plane cross-section of the bottle taken along line A-A shown in FIG. 1.

The biaxially drawn, blow molded, and laminated synthetic resin bottle, the injection molding device, and the process for molding the laminated preform by using this injection molding device of this invention are further described with respect to preferred embodiments, now referring to the drawings. FIGS. 1 and 2 show the laminated synthetic resin bottle in the first embodiment of this invention, in which FIG. 1 is a front view, and FIG. 2 is a plane cross-section taken along line A-A shown in FIG. 1. The bottle is a so-called pressure PET bottle made by using a PET resin as the main resin, and is used for beverages containing a carbonate ingredient. The bottle 201 comprises a neck 202, a neck ring 203, a shoulder 204, a cylindrical body 205, and a bottom 206 of a petaloid type having multiple extended feet.

This bottle 201 has a laminate structure over a given height range h2 (a height ranging from right beneath a lower end of the neck ring 203 to an upper end of the bottom 206). As shown in the plane cross-section of FIG. 2, the intermediate layer 213 is laminated between the outer layer 211 and the inner layer 212, both of which are the substrate layers of a main resin, such as a PET resin. On the other hand, the intermediate layer 213 is made of a gas barrier resin, such as a polyxylylene diamine adipamide (MXD6 nylon) resin. In addition, as shown in FIG. 2, this intermediate layer 213 is segmentalized in the circumferential direction by the vertical connecting zones 214*a*, which are formed in parallel in the circumferential direction of the bottle 201 and in a plural number (16 zones in this embodiment) along the axial direction or in the vertical direction, and are disposed on both the right and left sides of each intermediate layer segment to be formed, by joining and welding the outer layer 211 and the inner layer 212 together. It is noted in the front view of FIG. 1 that the bottle 201 shows eight vertical connecting zones 214*a* in the height range h2 extending from right beneath the neck ring 203 to the upper end of the bottom 206. As shown, the segments of the intermediate layer 213 are hatched for the convenience of easy understanding. Actually, however, the segments of the intermediate layer 213 are in tight contact with the substrate layers, i.e., with the outer layer 211 and the inner layer 212, and thus, the bottle 201 looks transparent in its outer appearance.

The user wants to sip a drink from a laminated PET pressure bottle of this kind made in conventional art, but at the instant when he/see removed the cap, there would be a drastic pressure drop inside the bottle, and the body wall would rapidly deform into a caved state. With this rapid deformation, the shearing force would act on the interface between the intermediate layer 213 and the outer layer 211 and/or the inner layer 212. Since the intermediate layer 213 of a nylon resin is in tight contact with, but not adhered to, the outer layer 211 or the inner layer 212 of a PET resin, there occurs the delamination, and the appearance of the bottle would be impaired now that the delamination becomes visible from the scattering or reflection of light at the delaminated portions.

On the other hand, the laminated bottle 201 in this embodiment produces an action-and-effect of the vertical connecting zones 214*a* by which the intermediate layer 213 is segmentalized in the circumferential direction. Even under a drastic pressure drop described above, the bottle can withstand the delamination effectively and maintain a transparent condition and good outer appearance. It is considered that the action-and-effect of the vertical connecting zones to protect the bottle against delamination is produced because the layers deform in a short span between two neighboring vertical connecting zones 214*a* in the laminate structure comprising an outer substrate layer 211/an intermediate layer 213/an inner substrate layer 212. Each span would have the limited shearing force acting on the interfaces between layers and thus, a limited degree of deformation.

Figure 3:
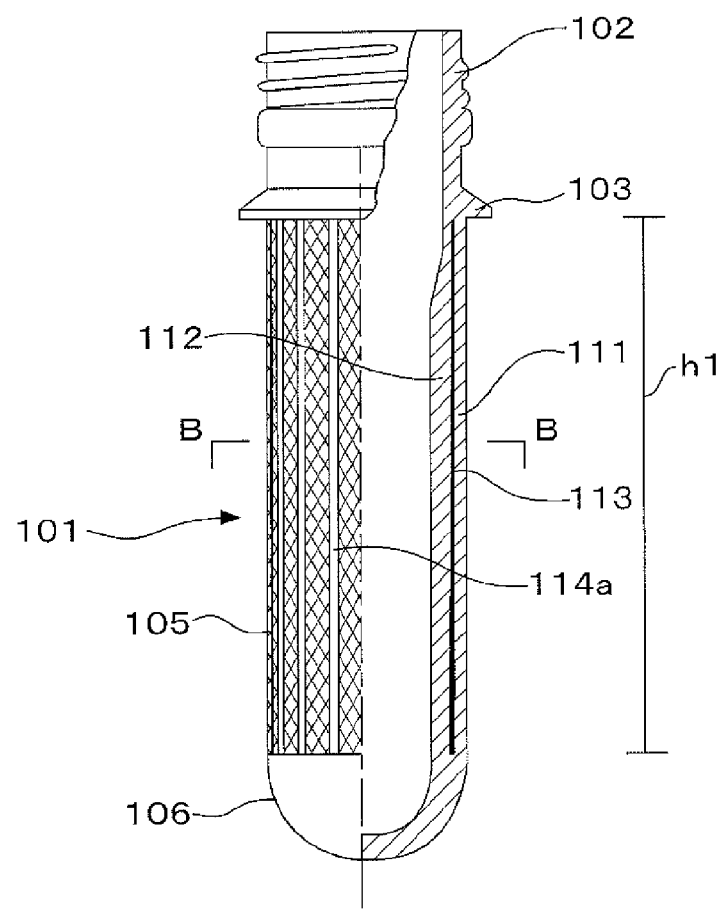
FIG. 3 is a front view, with a partial vertical section, of the laminated preform molded by the molding process of this invention and used to mold the bottle shown in FIG. 1.
Figure 4:
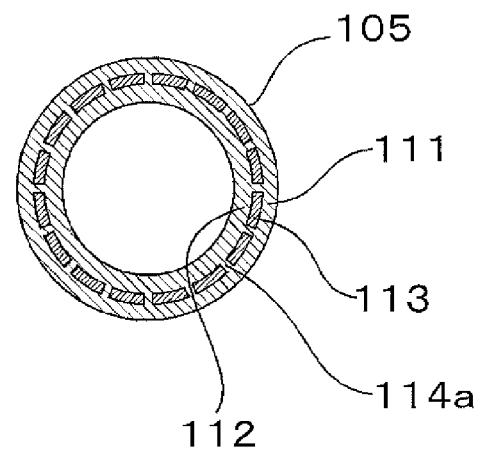
FIG. 4 is a plane cross-section of the preform taken along line B-B shown in FIG. 3.

FIGS. 3 and 4 show the laminated preform 101, that is, a primary molded product to be biaxial drawn and blow molded into the laminated bottle 201 in the above embodiment. FIG. 3 is a front view with a partial vertical cross-section; and FIG. 4, a plane cross-section taken along line B-B shown in FIG. 3. This laminated preform 101 is made of a PET resin as the main resin material, and has a shape of a test tube comprising a neck 102, a neck ring 103, a cylindrical body 105, and a bottom 106.

The preform 101 has a laminate structure in which the intermediate layer 113 extends over a given height range h1 (extending from right beneath the neck ring 103 to an upper end of the bottom 106 in this embodiment). In this height range, the intermediate layer 113 made of a gas barrier resin, such as polyxylylene diamine adipamide (MXD6 nylon), is laminated between the outer layer 111 and the inner layer 112, which are the substrate layers made of the main resin comprising a PET resin, as shown in the plane cross-section of FIG. 4. As can be seen in FIG. 4, this intermediate layer 113 is segmentalized in the circumferential direction by the vertical connecting zones 114*a*, formed in parallel in the circumferential direction and in a plural number (16 zones in this embodiment) along the centrally axial direction, by joining and welding together the outer and inner substrate layers 111, 112.

Figure 5:
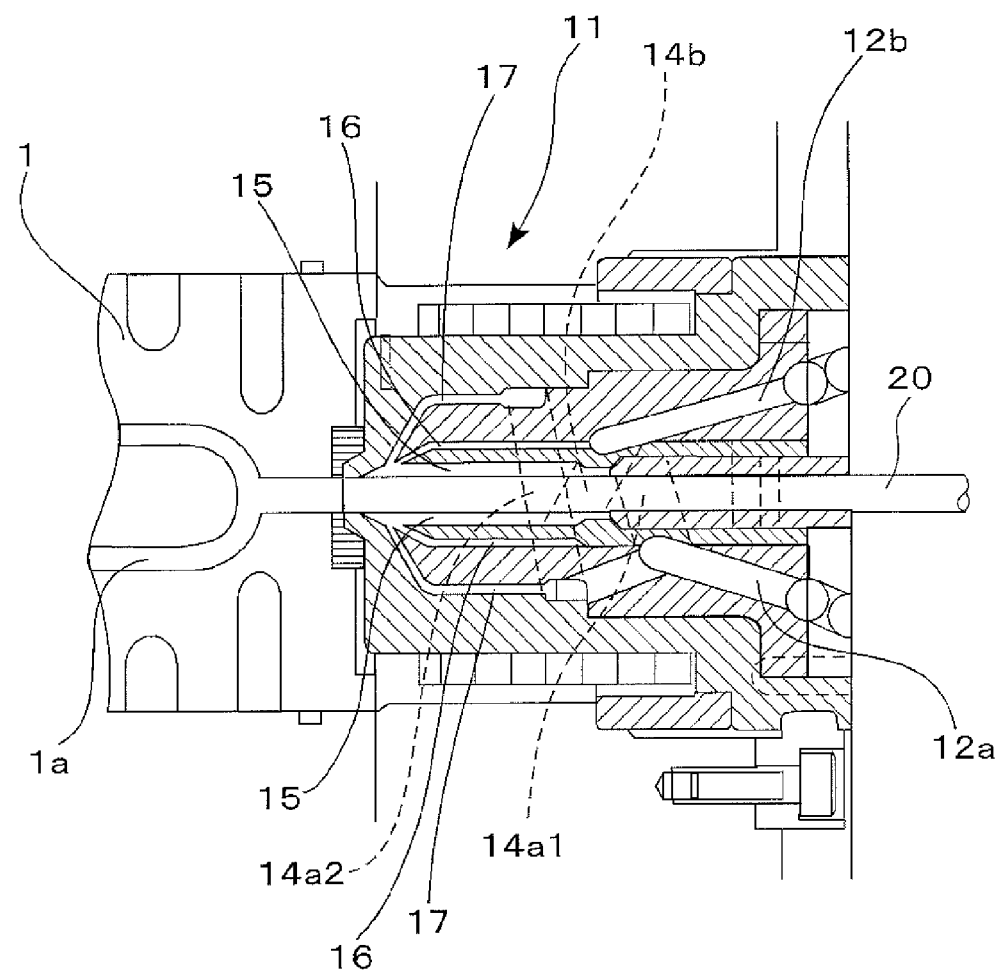
FIG. 5 is a vertical section of an embodiment of the multi-nozzle section of the injection molding device of this invention.
Figure 6:
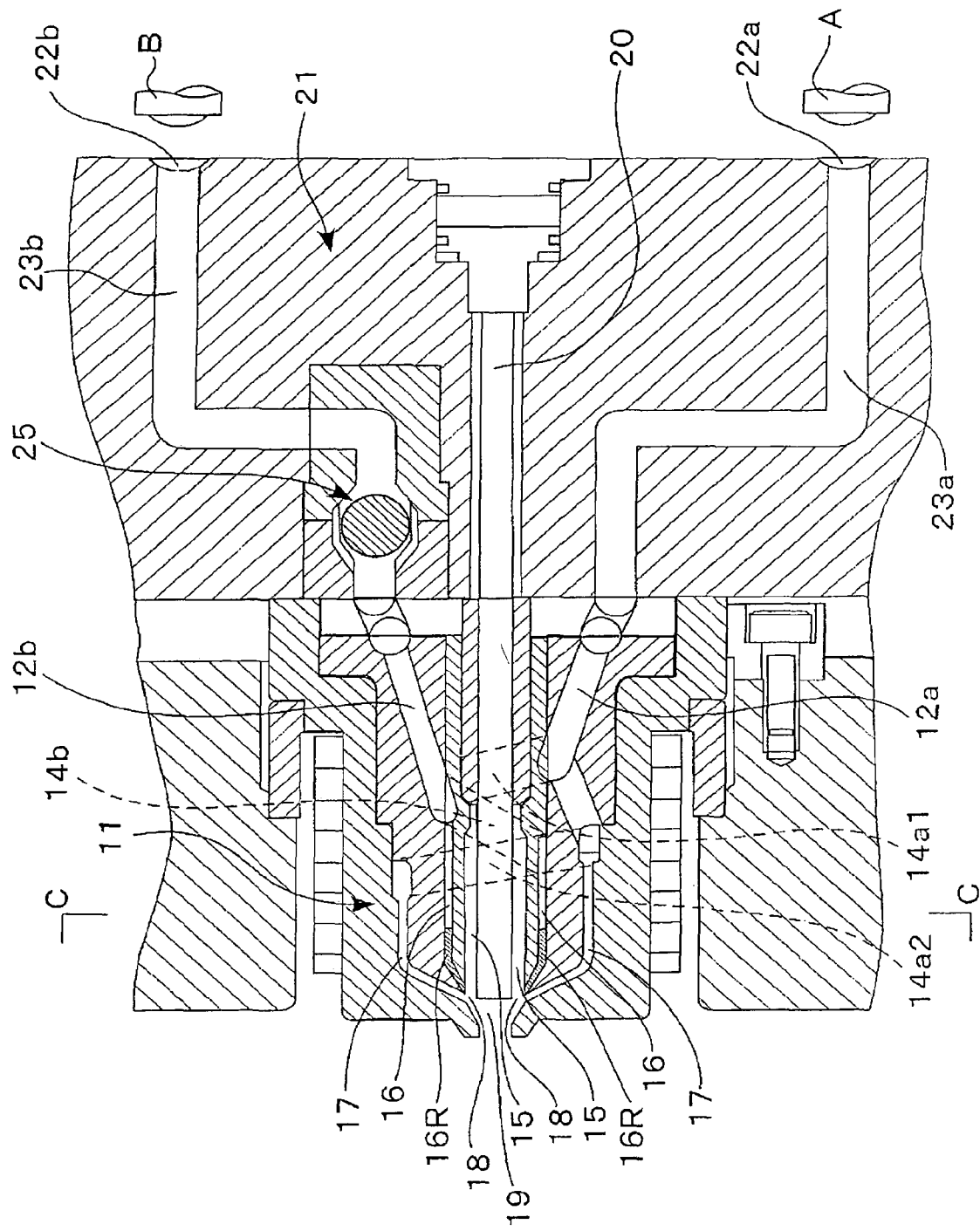
FIG. 6 is a vertical section of the multi-nozzle section of FIG. 5 combined with a hot runner block.
Figure 7:
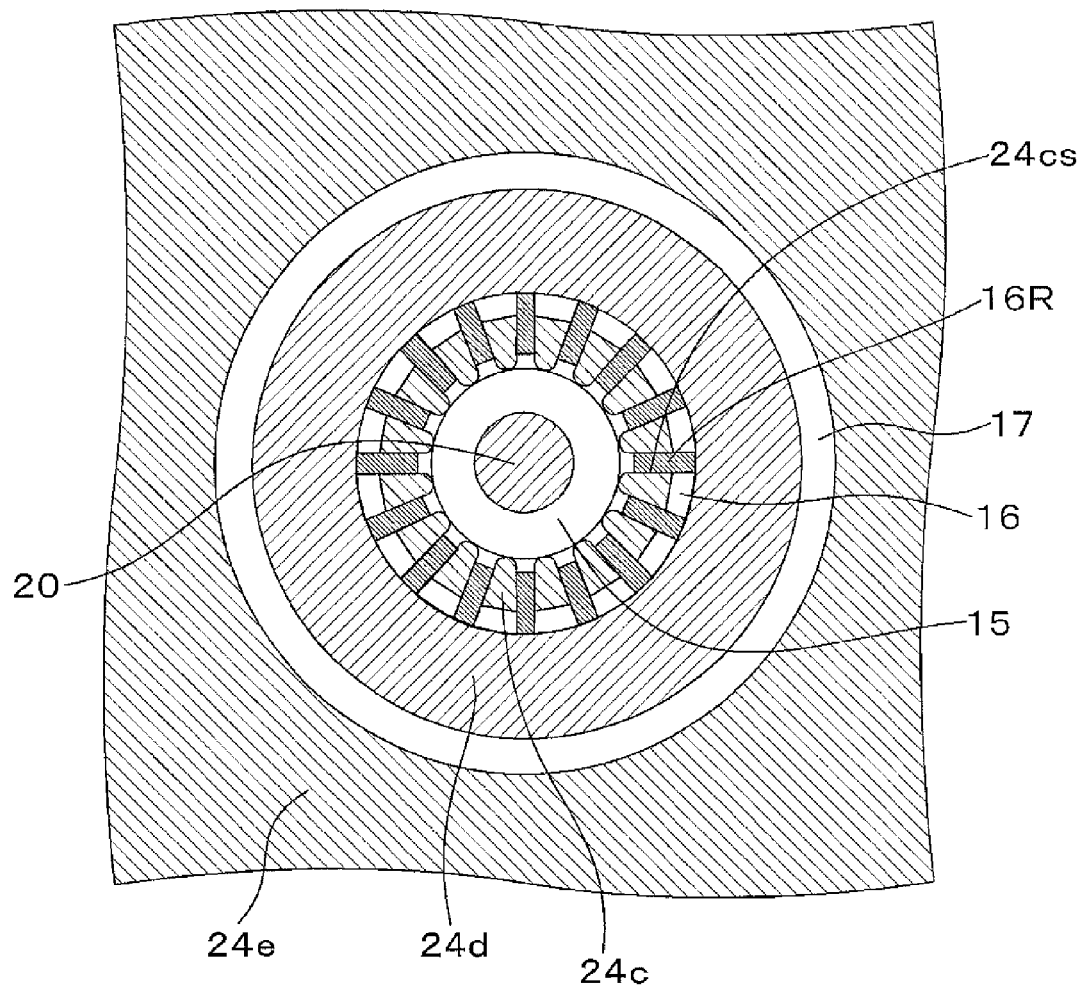
FIG. 7 is a plane cross-section of the multi-nozzle section taken along line C-C shown in FIG. 6.

Next, the process for injection molding the laminated preform 101 will be described below with respect to a preferred embodiment. The laminated preform 101 to be molded has the intermediate layer 113 segmentalized in the circumferential direction by the above-described vertical connecting zones 114a. FIGS. 5-7 show an example of the injection molding device of this invention, in which important parts are outlined. FIG. 5 is a vertical section showing an example of a multi-nozzle section 11, with a mold 1 fitted in the downstream. FIG. 6 is a vertical section of the multi-nozzle section 11 of FIG. 5, to which a hot runner block 21 is fitted in the upstream. FIG. 7 is a plane cross-section of the multi-nozzle section 11 taken along line C-C shown in FIG. 6.

This injection molding device comprises resin feeders A, B, which separately supply the device with two types of different resins in a molten state, the multi-nozzle section 11 where two molten resins are laminated, and the mold 1 to form the preform. The multi-nozzle section 11 comprises three layer-forming flow channels: a cylindrical inner flow channel 15 and a cylindrical outer flow channel 17 to form the substrate layers of the main resin and a cylindrical middle flow channel 16 to form the intermediate layer. Downstream of these three layer-forming flow channels, a joined cylindrical flow channel 19 is disposed by way of a confluence 18 where molten resins join after having flowed through the respective layer-forming flow channels.

At some points ranging from a given position along the middle flow channel 16 to the confluence 18, vertical blocking rib pieces 16R are disposed in parallel in the circumferential direction and in a plural number (16 in this embodiment) to divide the flow through the middle channel 16 into multiple streams in the circumferential direction. The plane cross-section of FIG. 7 shows the layout of a plural number of the vertical blocking rib pieces 16R disposed in parallel in the circumferential direction. As shown, 16 vertical blocking rib pieces 16R are disposed at an equal central angle and in the circumferential direction so as to cross the middle flow channel 16.

More specifically, the inner flow channel 15, the middle flow channel 16, and the outer flow channel 17 are all cylindrical, and are formed by a shut-off pin 20 and ring mandrels 24c, 24d, and 24e, which are disposed from inside outwards in a coaxial core state. The vertical blocking rib pieces 16R are set so as to cross the middle flow channel 16 under a condition that through-slits 24cs penetrate through the wall of the ring mandrel 24c, with outer end faces of the through-slits 24cs coming in contact with the inner peripheral wall of the ring mandrel 24d on the outside. The cylindrical middle flow channel 16 is thus segmentalized in the circumferential direction to form multiple, vertical streams.

Next, an explanation is given as to the process steps for molding the laminated preform 101 of FIGS. 3 and 4 by using this injection molding device. PET, the main resin, supplied from the feeder A, is fed from the feed port 22a, and is passed through the feed channel 23a inside the hot runner. A nylon resin, the intermediate-layer resin, supplied from the feeder B, is fed from the feed port 22b, and is passed through the feed channel 23b. The two resins are fed to the multi-nozzle section 11 at a predetermined timing. Then, the two resins are joined in this multi-nozzle section 11, and the cavity 1a of the mold 1 is filled with the joined resins (See FIG. 6).

The above resin feeders A and B that can be used in this invention include, for example, an extruder of a screw type, an accumulator having a plunger fitted at the end of the extruder, and the like.

A check valve 25 having a back-flow prevention function by means of a ball valve is disposed in the neighborhood of a point of connection to the multi-nozzle section 11 along the feed channel 23b through which the intermediate-layer resin flows. This check valve 25 can also be disposed in the multi-nozzle section 11 rather than along the feed channel 23b.

The main resin that has passed through the feed channel 23a now enters a guiding channel 12a. From here, the main resin is diverted into the cylindrical inner flow channel 15 and the cylindrical outer flow channel 17 by means of two manifolds 14a1 and 14a2. The intermediate-layer resin that has passed through the feed channel 23b now enters a guiding channel 12b. From here, the intermediate-layer resin is passed through the cylindrical middle flow channel 16 by means of a manifold 14b.

At the confluence 18, the intermediate-layer resin from the middle flow channel 16 is made to flow between the main resin from the inner flow channel 15 and the main resin from the outer flow channel 17. A multi-layer molten resin fluid is formed inside the joined flow channel 19 for a certain limited time, with the intermediate-layer resin being in the shape of an intermediate layer disposed in a coaxial core state between the layers of the main resin. The multi-layer fluid is injected into the cavity 1a of the mold 1 to fill the cavity with the fluid. It is noted here that the intermediate-layer resin has been formed inside the middle flow channel 16 so as to have a cylindrical shape, but that the resin is segmentalized in the circumferential direction by a plural number of vertical blocking rib pieces 16R which are disposed on the downstream side in parallel in the circumferential direction. Thus, the intermediate layer is laminated in a segmentalized state between the layers of the main resin.

Figure 8:
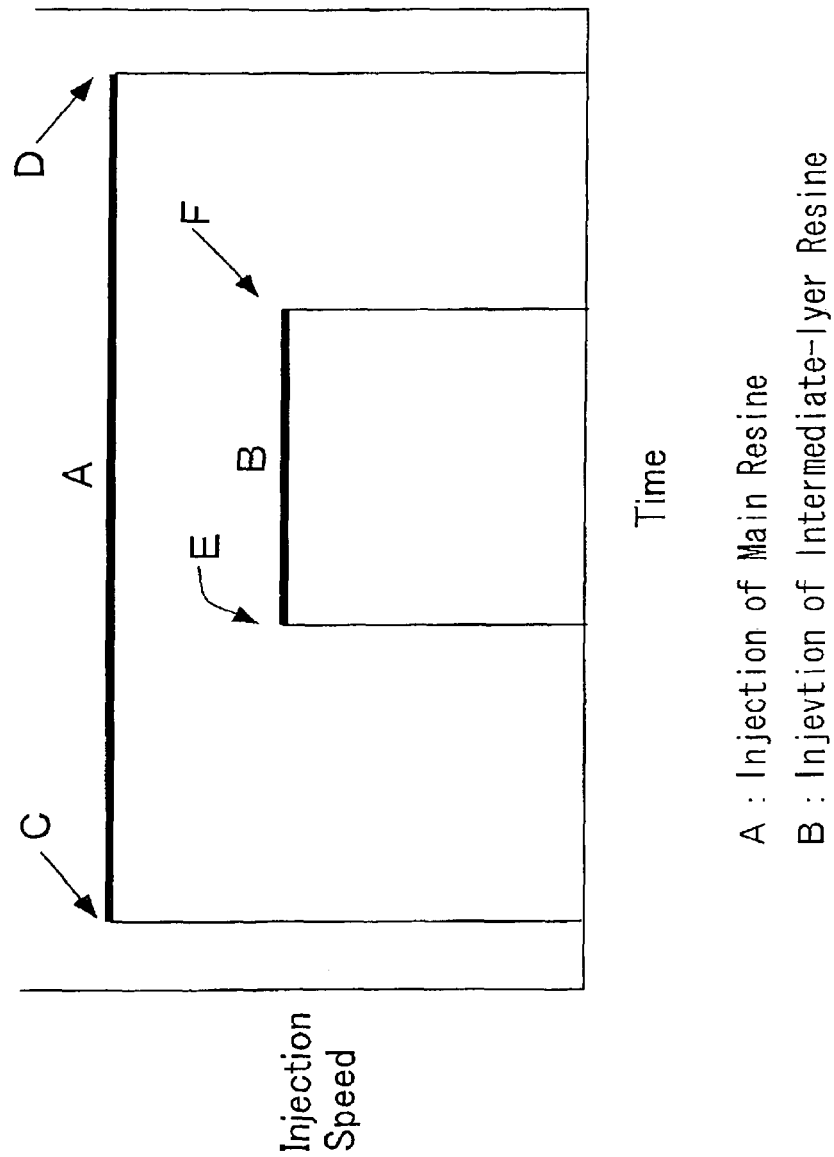
FIG. 8 is an explanatory diagram showing an example of injection pattern for molding the preform of FIG. 3.

FIG. 8 shows an example of injection pattern for the main resin and the intermediate-layer resin to mold the preform 101 shown in FIG. 3. FIG. 8 shows an outline of the injection pattern, with horizontal axis serving as the time axis, and longitudinal axis, as the injection speed. This injection pattern is one of the so-called simultaneous injection molding patterns. FIG. 9(a)-(c) are explanatory diagrams showing the flow of resins fed into the cavity 1a based on this injection pattern.

FIG. 9(a) shows a state in which the cavity 1a has been supplied only with the main resin, and the timing is just before point E in the injection pattern. At point E, the injection of the intermediate-layer resin starts. Over the range from point E to point F, the cavity 1a is filled with the resins in a laminated state where the intermediate-layer resin is sandwiched between layers of the main resin (See FIG. 9(b)). At point F, the injection of the intermediate-layer resin comes to a halt, and again, the cavity 1a is supplied only with the main resin, and then the injection process comes to an end (See FIG. 9(c)). In this way, the preform 101 can be obtained in which the intermediate layer has been laminated in a predetermined height range h1, as shown in FIG. 3. At that time, the intermediate-layer resin supply can be started and stopped, respectively, at points E and F in high precision and in a short time, by using the check valve 25 fitted to the feed channel 23b through which the intermediate-layer resin is fed. Thus, the height range h1 can be positioned very precisely.

According to the injection pattern shown in FIG. 8, the main resin is simultaneously injection-molded with the intermediate-layer resin. However, it is also possible to suspend tentatively the injection of the main resin that has been injected before, to inject only the intermediate-layer resin, and then to inject only the main resin in a sequential manner.

Figure 10:
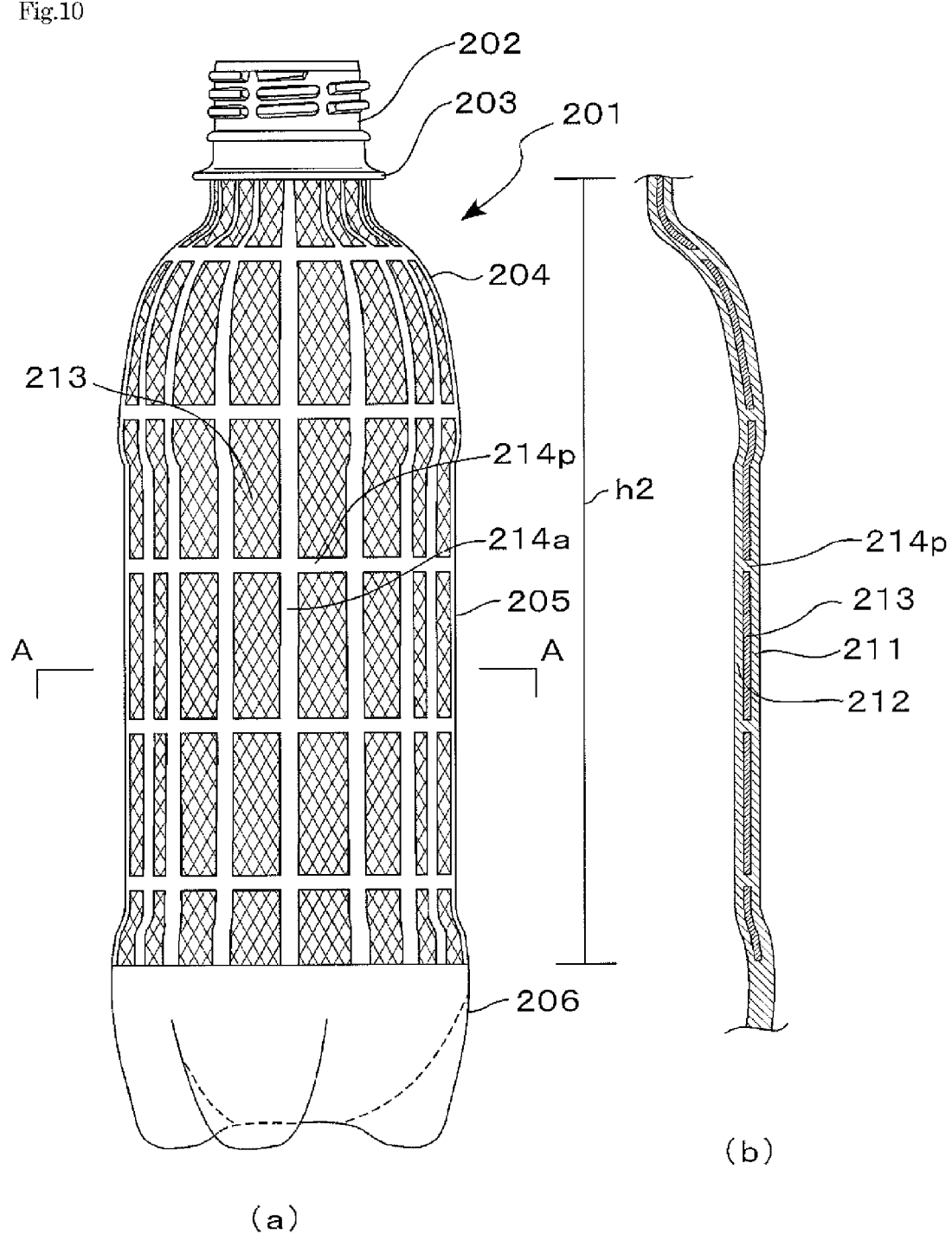
FIG. 10(*a*) is a front view of the bottle in the second embodiment of this invention.
Figure 11:
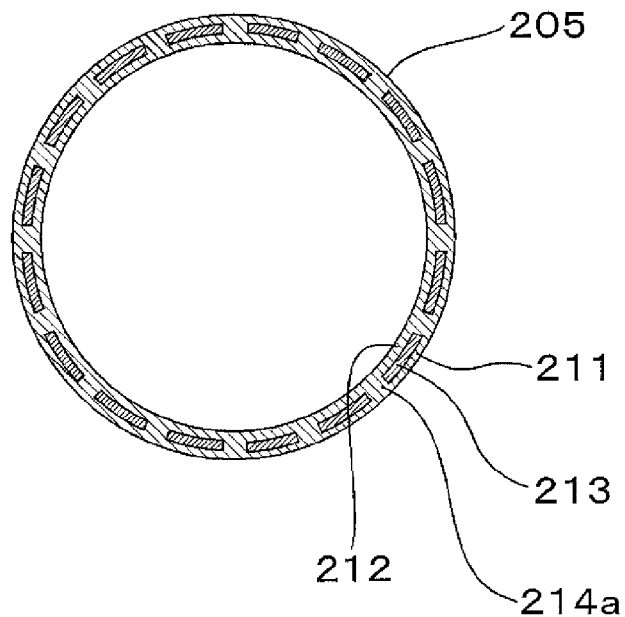
FIG. 11 is a plane cross section of the bottle in the second embodiment taken along line A-A in FIG. 10.

FIGS. 10 and 11 show the laminated synthetic resin bottle in the second embodiment of this invention. FIG. 10(a) is a front view; and FIG. 10(b), a vertical section showing a pattern of intermediate layer laminated in the axial direction. FIG. 11 is a plane cross-section taken from line A-A shown in FIG. 10. This bottle 201 is a so-called pressure PET bottle made of a PET resin as the main resin and used for beverages containing a carbonate ingredient. The bottle 201 comprises a neck 202, a neck ring 203, a shoulder 204, a cylindrical body 205, and a bottom 206 in a so-called petaloid shape having multiple projecting feet.

The bottle 201 has a laminate structure over a predetermined height range h2 (from right beneath the lower end of the neck ring 203 to an upper end of the bottom 206 in this embodiment), as shown in FIGS. 10(*b*) and 11. In this structure, the intermediate layer 213 made of a polyxylylene diamine adipamide resin (MXD6 nylon) having a gas barrier property is laminated between the outer layer 211 and the inner layer 212, both of which are the substrates of a PET resin serving as the main resin.

As can be seen in FIG. 10(*b*), the intermediate layer 213 is segmentalized in the predetermined height range h2 by horizontal connecting zones 214*p*, which are formed in parallel in the axial direction of the bottle 201 and in a plural number (5 zones in this embodiment) along the circumferential direction, by connecting directly the outer substrate layer 211 to the inner substrate layer 212. Furthermore, as can be seen in FIG. 11, the intermediate layer 213 is also segmentalized by the vertical connecting zones 214*a*, which are formed in parallel in the circumferential direction and in a plural number (16 zones in this embodiment) along the axial direction of the bottle 201, by connecting directly the outer layer 211 to the inner layer 212.

As can be seen in the front view of FIG. 10(*a*), the intermediate layer 213 is laminated between the outer layer 211 and the inner layer 212 in a state in which the layer is divided into segments in a rectangular shape, with four sides of each segment being surrounded by adjacent horizontal connecting zones 214*p* and adjacent vertical connecting zones 214*a*. At an upper end, the intermediate layer 213 is connected to the neck 202 including the neck ring 203 where no intermediate layer 213 is laminated. At a lower end, the intermediate layer 213 is connected to the bottom 206 having no intermediate layer 213. The front view of FIG. 10 shows cross-hatched segments as the areas where the intermediate layer 213 is laminated. Actually, however, the intermediate layer 213 is in tight contact with both the outer layer 211 and the inner layer 212, and the bottle is transparent in appearance.

If the user remove the cap from a prior-art laminated pressure PET bottle of this type to take a sip, then the body wall would be drastically caved in with rapid pressure drop inside the bottle.

This drastic deformation would cause the shearing force to act on the interfaces between the intermediate layer 213 of a nylon resin and the outer layer 211 and/or the inner layer 212 of a PET resin. Since these layers are in tight contact but are not adhered to one another, delamination would take place, and becomes visible from scattering or reflection of light at the peeled.

On the other hand, in the case of the laminated bottle 201 of this embodiment, an action-and-effect can be attained by both the horizontal connecting zones 214*p* and the vertical connecting zones 214*a*, which make the intermediate layer 213 segmentalized in the axial and circumferential directions. Even under a sharp pressure drop described above, the delamination can be prevented effectively from occurring, and the bottle can maintain good, transparent appearance. The action-and-effect of the horizontal connecting zones 214*p* and the vertical connecting zones 214*a* to prevent the above-described delamination is considered to work in the following manner: Under the laminate structure comprising an outer substrate layer 211, an intermediate layer 213, and an inner substrate layer 212, the intermediate layer 213 deforms only in short spans partitioned by adjacent horizontal connecting zones 214*p* and adjacent vertical connecting zones 214*a*. The extent of deformation is thus limited to small segments of the intermediate layer 213 partitioned by these connecting zones. The shearing force action on the interfaces, too, is likely to be limited.

Figure 12:
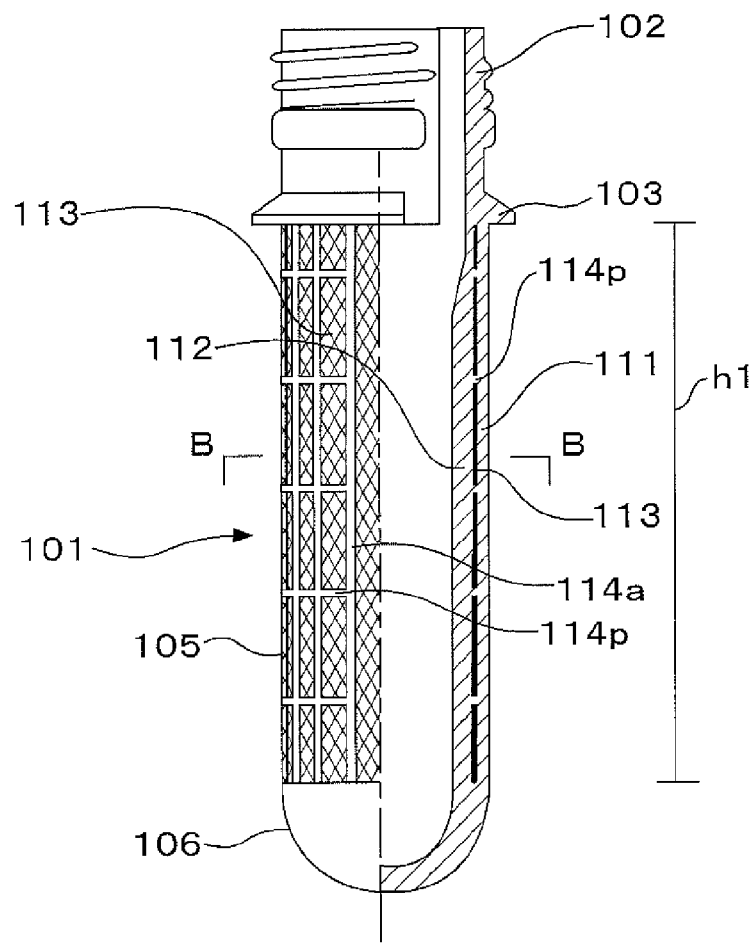
FIG. 12 is a front view, with a partial vertical section, of the laminated preform molded by the molding process of this invention and used to mold the bottle of FIG. 10.
Figure 13:
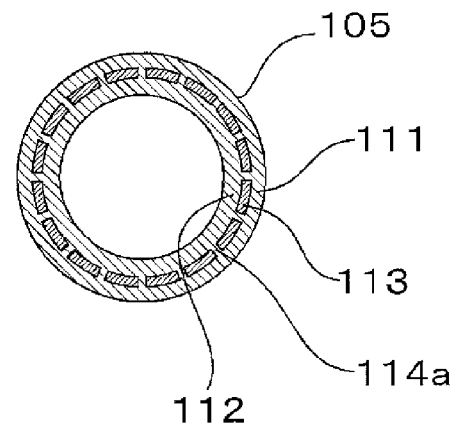
FIG. 13 is a plane cross-section of the preform of FIG. 12 taken along line B-B in FIG. 12.

FIGS. 12 and 13 show the laminated preform, which is a primary molded product to be biaxially drawn and blow molded into the laminated bottle 201 of FIG. 10 and which is injection molded by the molding process of this invention later described. FIG. 12 is a front view with a part in a vertical section. FIG. 13 is a plane cross-section of the laminated preform taken from line B-B shown in FIG. 12. This preform 101 is made of a PET resin as the main material, has a shape of a test tube, and comprises a neck 102, a neck ring 103, a cylindrical body 105, and a bottom 106.

This preform 101 has a laminate structure in which an intermediate layer 113 of a polyxylylene diamine adipamide (MXD6 nylon) having a gas barrier property is laminated between an outer layer 111 and an inner layer 112, both of which are substrate layers of a PET resin used as the main resin, as shown in the plane cross-section of FIG. 13, and is disposed in a predetermined height range h1 (from right beneath the neck ring 103 to an upper end of the bottom 106 in this embodiment).

As shown in the vertical section in FIG. 12, the intermediate layer 113 is segmentalized in the axial direction by the horizontal connecting zones 114*p*, which are formed in parallel in the axial direction of the preform 101 and in a plural number (5 zones in this embodiment) along the circumferential direction, by joining and welding the outer substrate layer 111 and the inner substrate layer 112 together. As shown in FIG. 12, the intermediate layer 113 is also segmentalized in the circumferential direction by the vertical connecting zones 114*a*, which are formed in parallel in the circumferential direction and in a plural number (16 zones in this embodiment) along the axial direction, by joining and welding the outer substrate layer 111 and the inner substrate layer 112 together.

Figure 14:
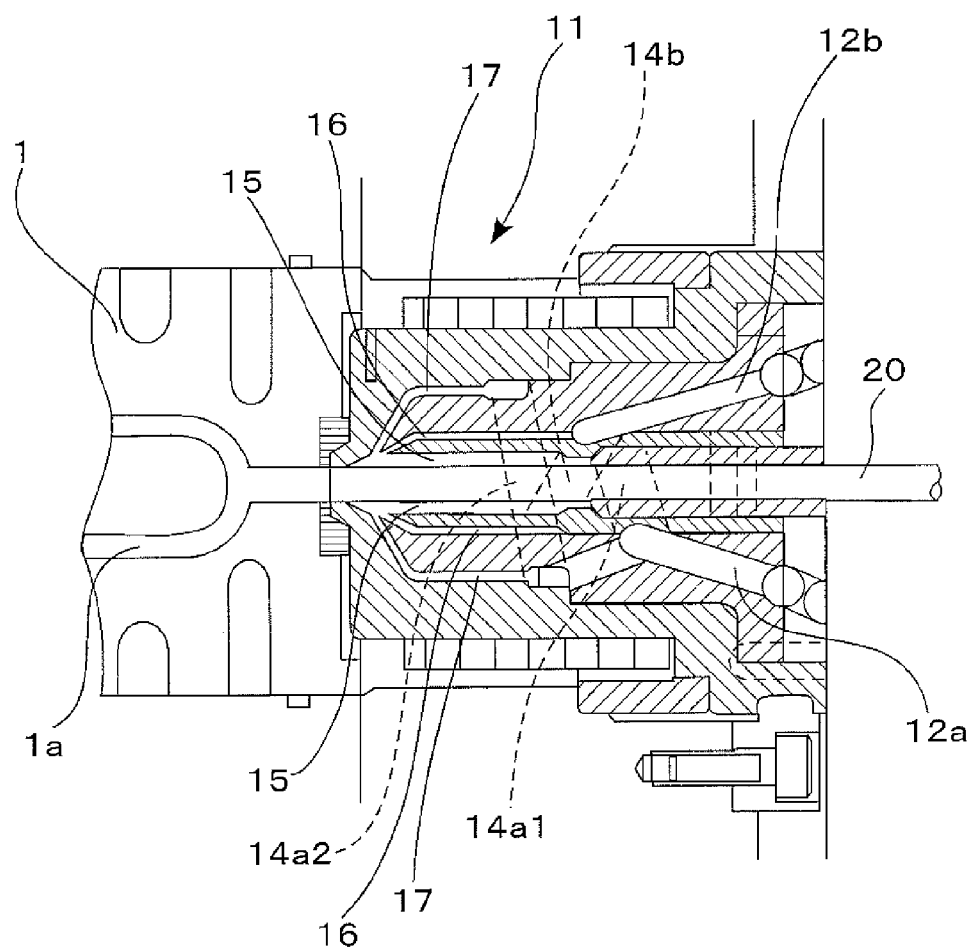
FIG. 14 is a vertical section showing the multi-nozzle section of the injection molding device used to form the preform of FIG. 12.
Figure 15:
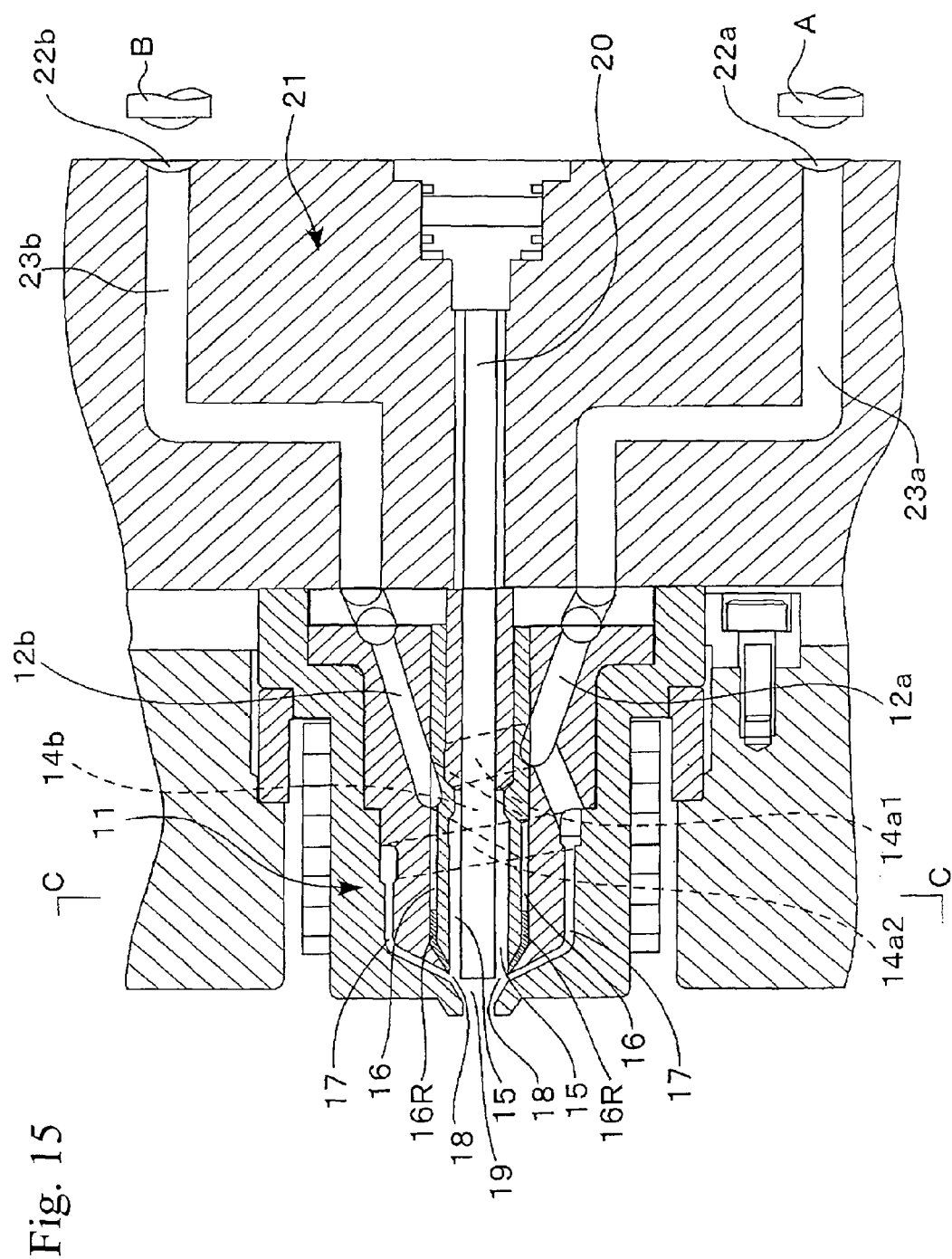
FIG. 15 is a vertical section showing the multi-nozzle section of FIG. 14 combined with the hot runner block.
Figure 16:
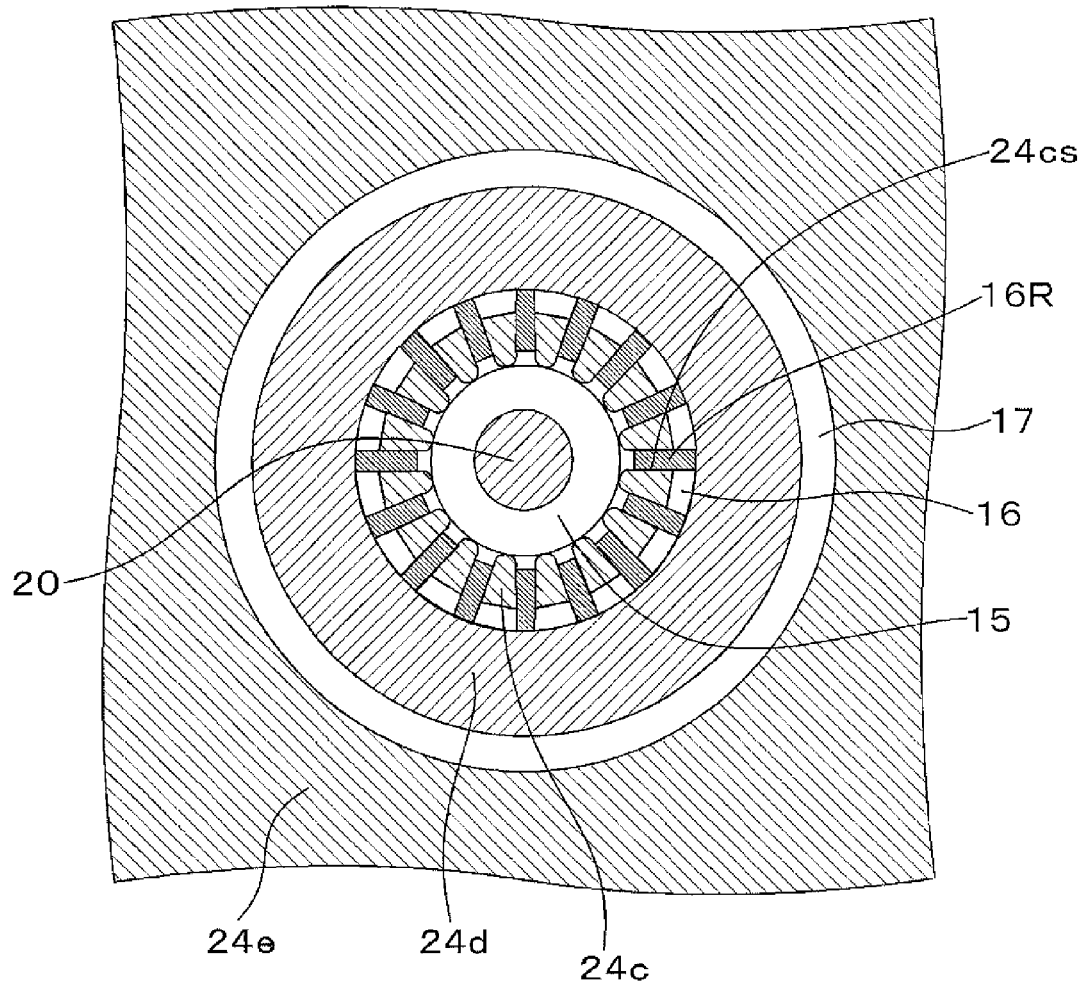
FIG. 16 is a plane cross-section of the multi-nozzle section taken along line C-C in FIG. 15.

The process for molding the laminated preform 101 will be described with respect to its preferred embodiment, in which the intermediate layer 113 has been segmentalized in both the axial and circumferential directions by the horizontal connecting zones 114*p* and the vertical connecting zones 114*a* described above. FIGS. 14-16 show an outlined important part of the injection molding device used to mold the laminated preform 101 of FIG. 12. FIG. 14 is a vertical section showing an example of the multi-nozzle section 11 to which the mold 1 has been fitted on the downstream side. FIG. 15 is a vertical section showing the multi-nozzle section 11 of FIG. 14, to which the hot runner block 21 has been fitted on the upstream side. FIG. 16 is a plane cross-section of the multi-nozzle section 11, taken along line C-C shown in FIG. 15. It is noted here that the multi-nozzle section 11 shown in FIGS. 14 and 16 is structurally similar to that shown in FIGS. 5 and 7, but that the multi-nozzle section 11 shown in FIGS. 14 and 16 differs from that shown in FIGS. 5 and 7 in that the check valve 25 has been disposed in the hot runner block 21 of FIG. 6 while the check valve 25 is not used in this case, as shown in FIG. 15.

Next, process steps using the above-described injection molding device will be described in the case of the process for molding the laminated preform of this invention, associated with the laminated preform 101 shown in FIGS. 12 and 13. The PET resin, a main resin, is supplied from the resin feeder A, is passed through the feed port 22*a* and the feed channel 23*a* inside the hot runner, and is sent to the multi-nozzle section 11. The nylon resin, an intermediate-layer resin, is supplied from the resin feeder B, is passed through the feed port 22b and the feed channel 23b, and sent to the multi-nozzle section 11 at a predetermined timing. The resins join together in the multi-nozzle section 11, and two resins (three layers) are fed into the cavity 1a of the mold 1 (See FIG. 15).

The main resin is passed through the feed channel 23a and the guide channel 12a, and is divided into the cylindrical inner channel 15 and the cylindrical outer channel 17 by means of respective manifolds 14a1 and 14a2. The intermediate-layer channel is passed through the feed channel 23b and the guide channel 12b, and is led into the middle flow channel 16 by means of the manifold 14b.

At the confluence 18, the flow of the intermediate-layer resin from the middle flow channel 16 is sandwiched by the layers of the main resin coming from the inner flow channel 15 and the outer flow channel 17. Inside the joined flow channel 19, a column-shape multi-layer molten resin fluid is formed so that the intermediate layer coaxially disposed between the layers of the main resin, and this fluid is injected into the cavity 1a of the mold 1 to fill the cavity therewith. At that time, the intermediate-layer resin formed cylindrically in the middle flow channel 16 is segmentalized in the circumferential direction by the vertical blocking rib pieces 16R, which are disposed on the downstream side in parallel in the circumferential direction of the preform and in a plural number. The intermediate-layer resin in segments is laminated between layers of the main resin, and thus, vertical connecting zones 114a are formed in the body of the laminated preform 101, as shown in FIGS. 12 and 13.

Figure 17:
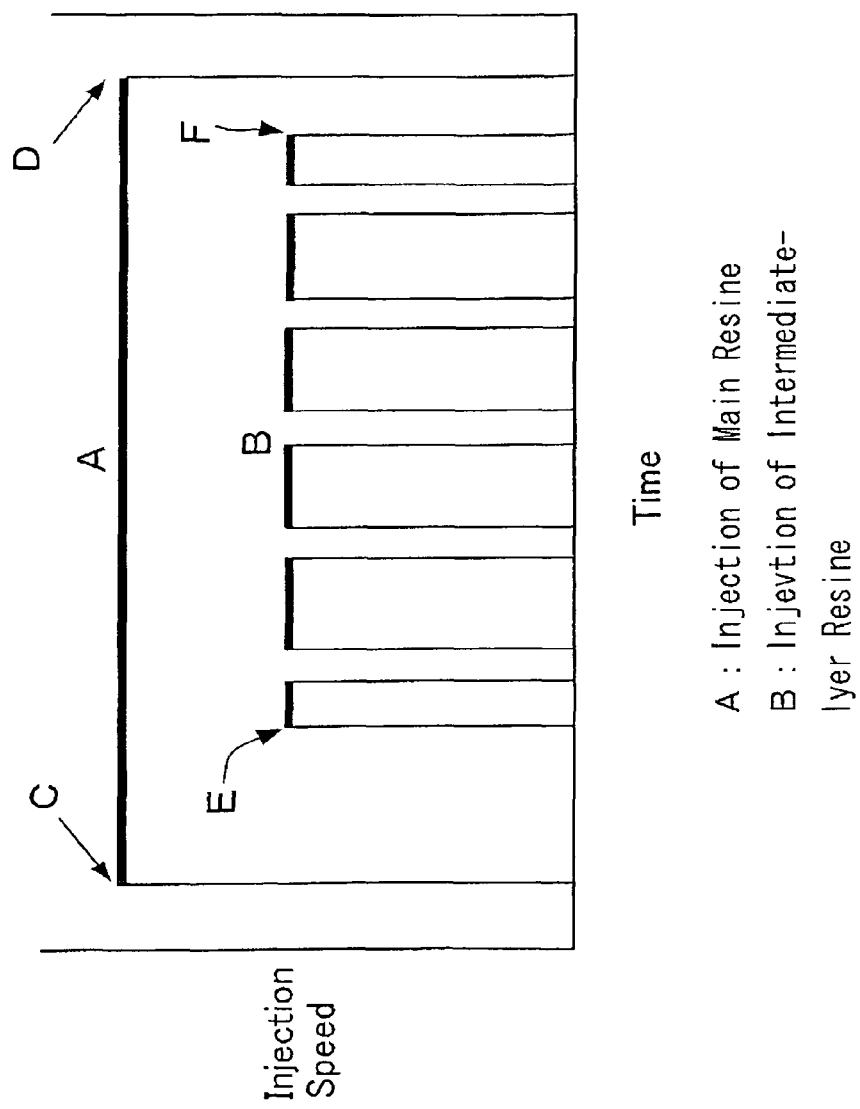
FIG. 17 is an explanatory diagram showing an example of the injection pattern for molding the preform of FIG. 12.

Next, FIG. 17 is an exemplified injection pattern for the main resin and the intermediate-layer resin to mold the preform 101 shown in FIG. 12, with horizontal axis serving as the time axis, and longitudinal axis, as the injection speed. This injection pattern is one of the so-called simultaneous injection molding patterns. In this example, the start and stop of injection of the intermediate-layer resin are repeated at given time intervals (repeated 6 times in this embodiment). Thus, the intermediate-layer resin is intermittently supplied to the middle flow channel 16 to obtain segmentalized intermediate layer 113.

Figure 18:
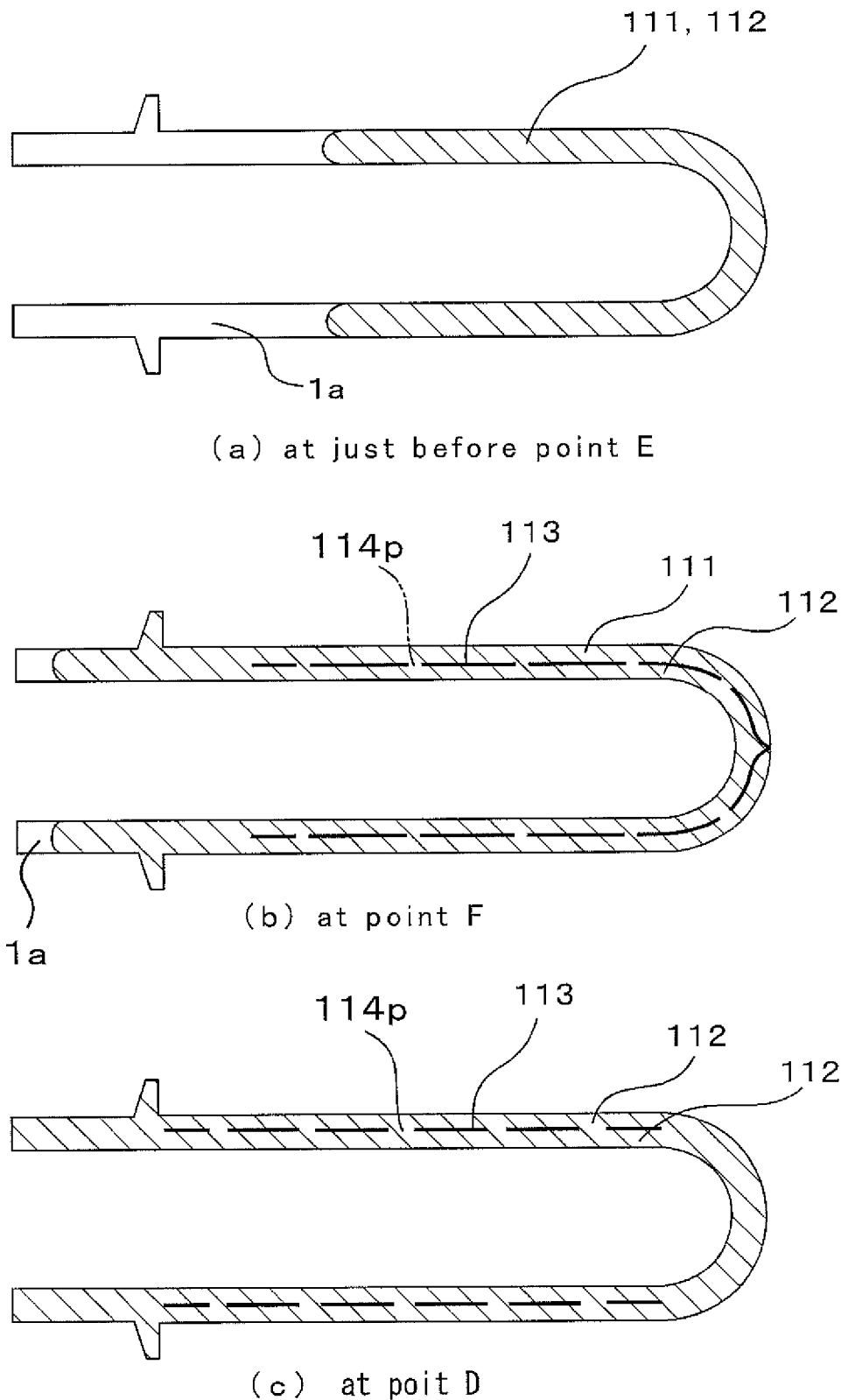
FIG. 18 is explanatory diagrams showing a manner in which the mold cavity is filled with molten resins in the injection pattern of FIG. 17.

FIG. 18(a)-(c) are explanatory diagrams showing the flow of resins fed into the cavity 1a, based on this injection pattern. FIG. 18(a) shows a state of injection right before point E of the injection pattern. In this state, only the main resin has been fed. At point E, intermittent injections of the intermediate-layer resin get started. Between points E and F, the intermediate-layer resin is laminated between the layers of the main resin, but the resin is segmentalized in the circumferential direction by the above-described vertical blocking rib pieces 16R, and is also segmentalized in the axial direction in accordance with the injection pattern shown in FIG. 17. Then, the mold cavity 1a is filled with the laminate having a grid pattern of segments (See FIG. 18(b)). At point F, the injection of the barrier resin comes to an end, and from then on, only the main resin is fed again to finish the injection process (See FIG. 18(c)), and thus, the laminated preform 101 is molded. The horizontal connecting zones 114p of the laminated preform 101 shown in FIG. 12 are formed by the process steps based on the injection pattern of FIG. 17.

The laminated preform 101 thus obtained has a laminate structure in which the intermediate layer 113 has been segmentalized horizontally and vertically by the horizontal connecting zones 114p and by the vertical connecting zones 114a that are formed by the vertical blocking rib pieces 16R.

In order for the supplies of the intermediate-layer resin to be started and stopped according to the injection pattern of FIG. 17, in a predetermined time span, in high precision, and instantaneously, and especially in order for the resin supply to be cut at once at the time of stoppage, it is effective to use a so-called pullback method involving setting back the screw in an instant at the intermediate-layer resin feeder B.

Figure 19:
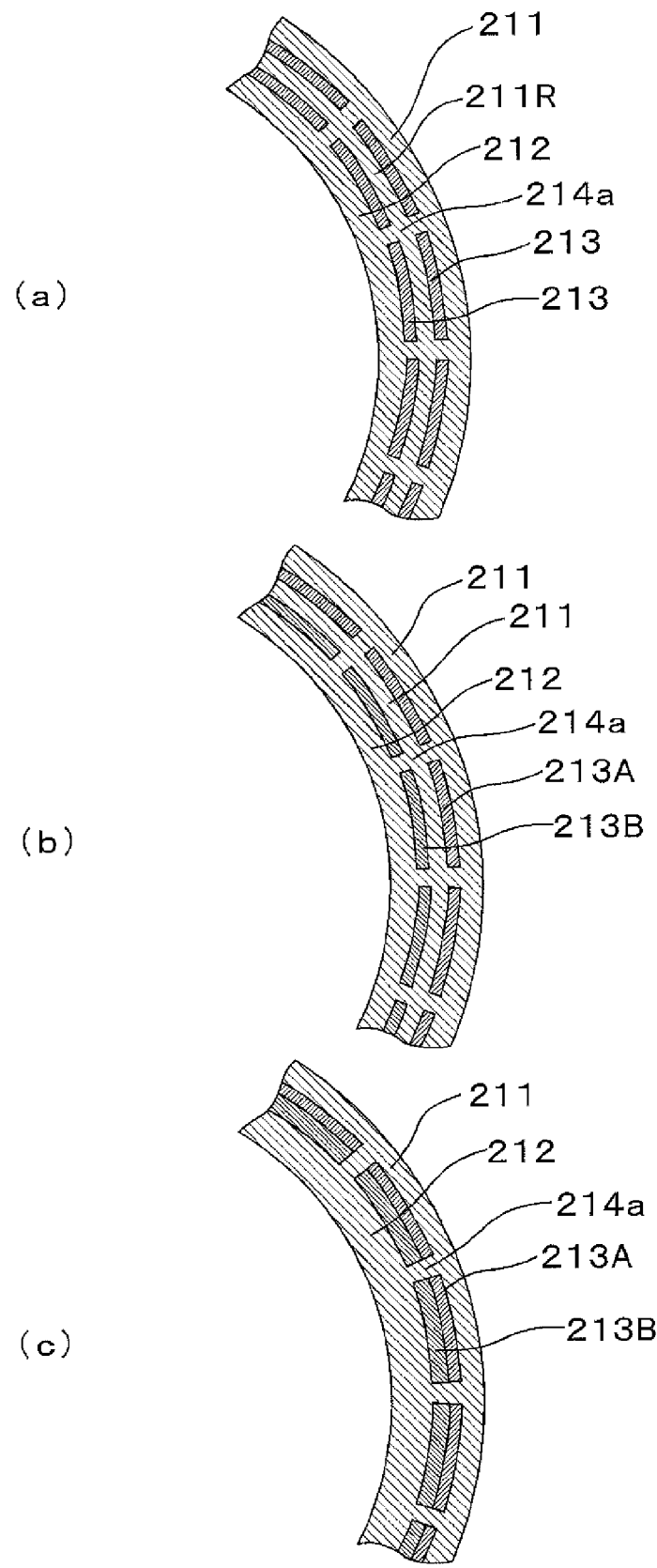
FIG. 19(*a*)(*b*)(*c*) are partial plane cross sections showing other examples of the laminate structure of the bottle associated with the molding process of this invention.
Figure 20:
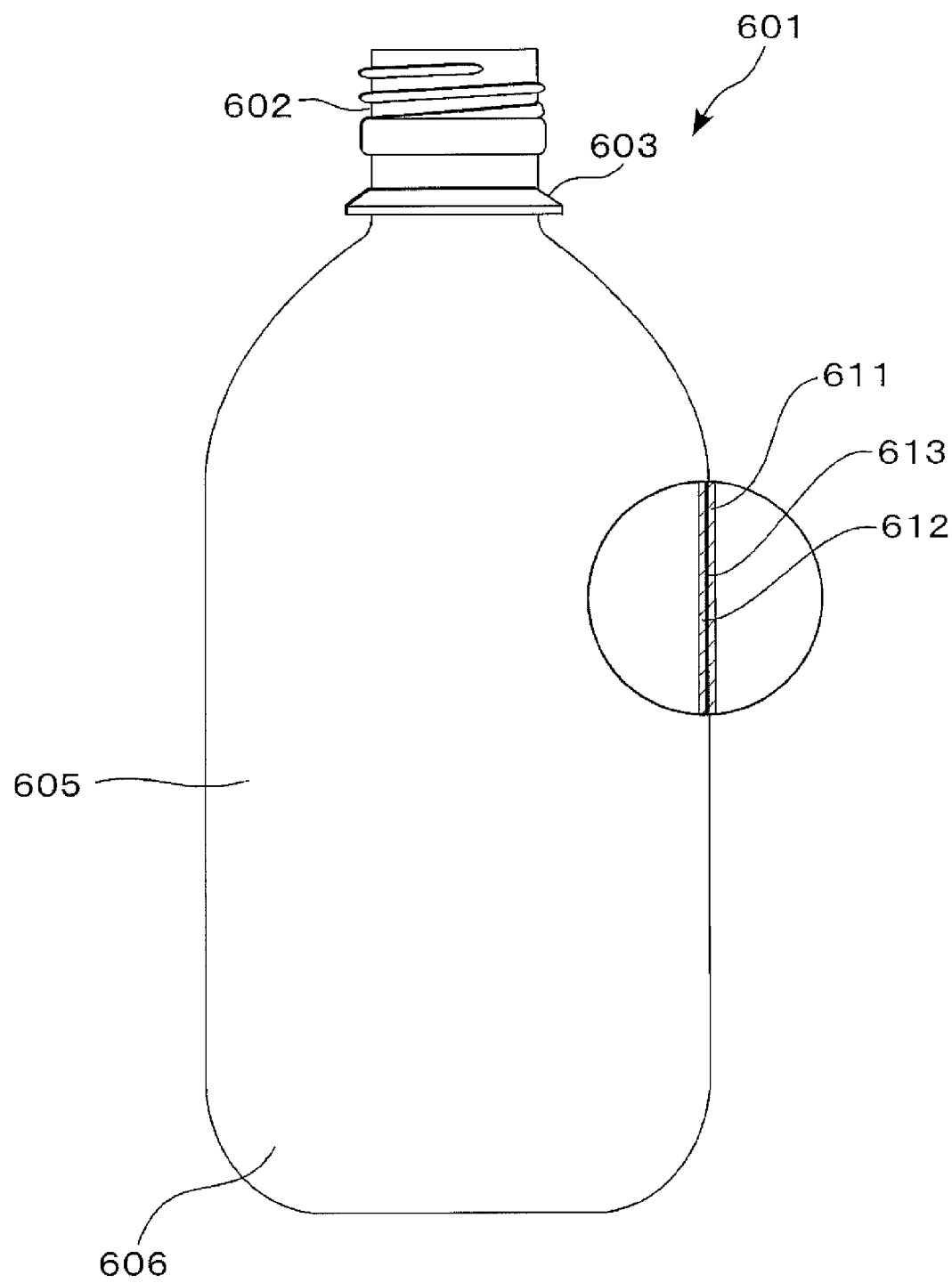
FIG. 20 is a front view of a laminated bottle of prior art.
Figure 21:
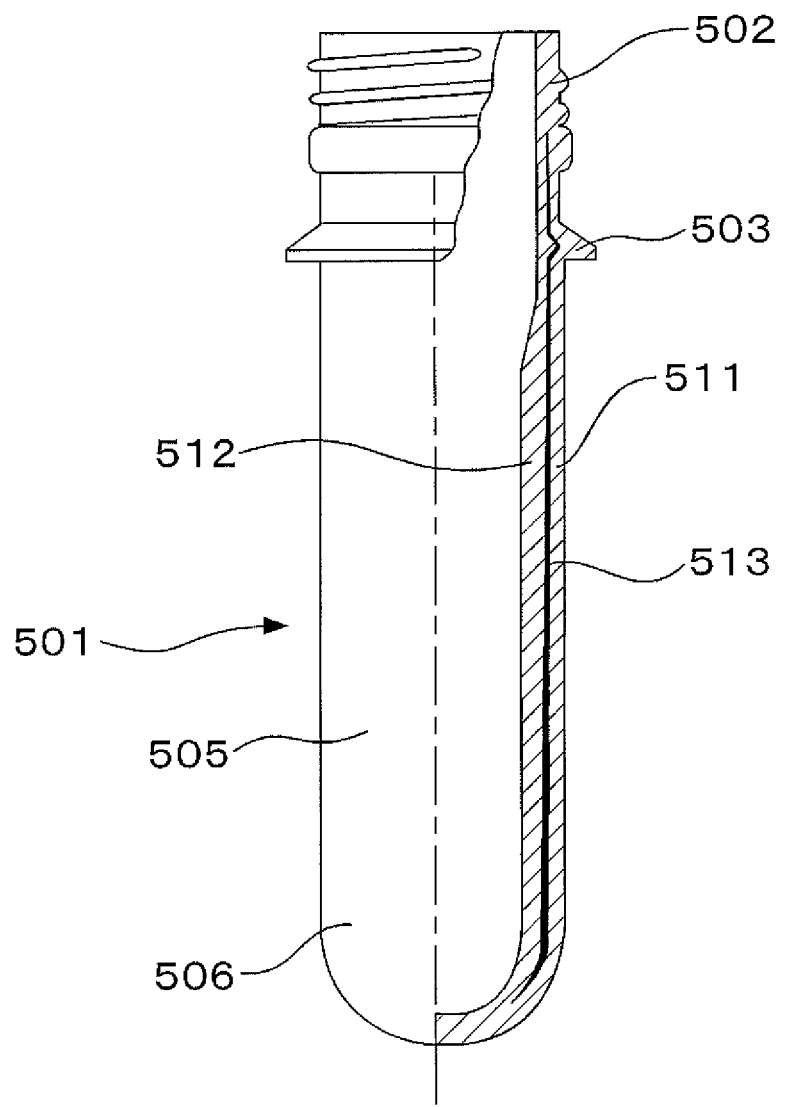
FIG. 21 is a front view, with a partial vertical section, of the laminated preform of prior art.

This invention including the biaxially drawn, blow molded synthetic resin bottle, the injection molding device, and the process for molding the laminated preform have been described with respect to preferred embodiments. However, it is to be understood that this invention should not be construed as limitative to these embodiments. For example, the laminated bottle in the above embodiment of this invention has a laminate structure of 2 resins and 3 layers, as shown in plane cross-section of FIG. 2 or 11, but if necessary, the bottle may have various other laminate structures. FIGS. 19(a)-(c) show other examples of laminate structures for the laminated bottle of this invention in the plane cross-sections similar to FIG. 2 or FIG. 11. These (a), (b), and (c) show the following laminate structures in the order of layers from outside to inside:

(a) A laminate of 3 resins and 5 layers comprising: A substrate layer 211/An intermediate layer 213/A substrate layer 211R made of a recycled resin/An intermediate layer 213/A substrate layer 212.

(b) A laminate of 3 resins and 5 layers comprising: A substrate layer 211/An intermediate layer 213A/A substrate layer 211/Another intermediate layer 213B/A substrate layer 212.

(c) A laminate of 3 resins and 4 layers comprising: A substrate layer 211/An intermediate layer 213A/Another intermediate layer 213B/A substrate layer 212.

Under these laminate structures, too, the intermediate layer or layers is/are segmentalized by the vertical connecting zones 114a that are derived from the substrate layers and are disposed on both sides of each vertical segment of the intermediate layer.

Vertical connecting zones 214a are set at a number of 16 zones in the embodiment for the laminated bottle of FIG. 1. However, measurement values such as the number and/or width of vertical or horizontal connecting zones can be determined properly by taking into account the purpose of bottle use, the functions of the intermediate layer, such as the gas barrier property, and productivity of the preforms or the bottles manufactured using the preforms as the primary molded products.

The second embodiment of the laminated bottle of FIG. 10 shows 5 horizontal connecting zones 114p and 16 vertical connecting zones 114a. The measurement values such as the number and/or width of these connecting zones can also be determined properly by taking into account the purpose of bottle use, the functions of the intermediate layer, such as the gas barrier property, and moldability (or productivity) of the preforms or the bottles manufactured using the preforms as the primary molded products.

In the embodiment of the laminated bottle 201 of FIG. 1 or FIG. 10, both the horizontal connecting zones 214p and the vertical connecting zones 214a are disposed at a regular interval. These zones need not always be disposed at a regular interval, but the interval can be appropriately adjusted so that some areas may have a narrow interval, if delamination tends to occur more frequently in those areas than in other areas.

The preferred embodiments have been described above as a round bottle, but the bottle may be a square bottle as well. Since in that case, the bottle shape is not isotropic, the positions of a plural number of vertical connecting zones are not set at an equal central angle, but are determined by giving consideration to an angle position or positions where delamination tends to occur.

In the above embodiments, a PET resin was used as the main resin, and a nylon resin, as the intermediate-layer resin, but various combinations of synthetic resins can be used, taking into consideration the purpose of bottle use, moldability, and the function desired for the intermediate layer.

INDUSTRIAL APPLICABILITY

According to this invention, it is easy to obtain a bottle having a laminate structure in which the intermediate layer is segmentalized by the vertical and/or horizontal connecting zones. Such a bottle enables delamination of the intermediate layer from the outer layer and/or the inner layer to be controlled effectively when the delamination takes place as caused by molding shrinkage, pressure changes inside the bottle, and the like. The bottle of this invention is expected to have a wide application of use in the field of carbonate beverages.

DESCRIPTION OF REFERENCE SIGNS

1. Mold
1a. Cavity
11. Multi-nozzle section
12a. Guide channel for the main resin
12b. Guide channel for the intermediate-layer resin
14a1, 14a2, 14b. Manifold
15. Inner flow channel
16. Middle flow channel
16R. Vertical blocking rib pieces
17. Outer flow channel
18. Confluence
19. Joined flow channel
20. Shut-off pin
21. Hot runner block
22a. Main resin feed port
22b. Intermediate resin feed port
23a. Feed channel
23b. Feed channel
24c, 24d, 24e. Ring mandrel
24cs. Through-slit
25. Check valve
A. Main resin feeder
B. Intermediate-layer resin feeder
101, 501. Preform
102, 502. Neck
103, 503. Neck ring
105, 505. Body
106, 506. Bottom
111, 511. Outer substrate layer
112, 512. Inner substrate layer
113, 513. Intermediate layer
114p. Horizontal connecting zone
114a. Vertical connecting zone
h1. Height range
201, 601. Bottle
202, 602. Neck
203, 603. Neck ring
204, 604. Shoulder
205, 605. Body
206, 606. Bottom
211, 611. Outer substrate layer
212, 612. Inner substrate layer
213 (213A, 213B), 613. Intermediate layer
214p. Horizontal connecting zone
214a. Vertical connecting zone
h2. Height range

What is claimed is:

1. An injection molding device for injection molding a laminated preform that: (i) is in a test-tube shape, (ii) has substrate layers of a main resin and at least an intermediate layer, and (iii) is for use in biaxial drawing and blow molding, said injection molding device comprising:
two resin feeders configured to feed the main resin and at least a resin for forming an intermediate layer, a multi-nozzle section in which to laminate the main resin with the intermediate-layer resin, and a mold for molding the preform,
wherein the multi-nozzle section comprises at least three layer-forming flow channels:
a cylindrical inner flow channel and a cylindrical outer flow channel to form the substrate layers of the main resin,
a cylindrical middle flow channel located between the inner flow channel and the outer flow channel to form the intermediate layer, and
a joined flow channel disposed downstream of at least three layer-forming flow channels and by way of a confluence where molten resins join after having flowed through respective layer-forming flow channels; and
wherein at some points ranging from a given position along the cylindrical middle flow channel to the confluence, a plural number of vertical blocking rib pieces are disposed in parallel in the circumferential direction so as to cross the cylindrical middle flow channel and to divide the flow through the cylindrical middle channel into multiple streams along the circumferential direction.

2. A process for molding a laminated preform by an injection molding device, said preform: (i) being in a test-tube shape and for use in biaxial drawing and blow molding, (ii) having substrate layers and an intermediate layer laminated between the substrate layers in a given height range, and (iii) having such a laminate structure that narrow vertical connecting zones having no intermediate layer and having substrate layers welded directly with each other are formed in parallel in a circumferential direction and in a plural number along an axial direction of the preform and are disposed on both right and left sides of each intermediate layer segment to be formed in this height range, thus allowing the intermediate layer to be segmentalized in the circumferential direction by these vertical connecting zones,
the process comprising the steps of:
(i) providing an injection molding device having a multi-nozzle section configured to laminate the substrate layers made of a main resin with an intermediate layer made of an intermediate-layer resin,
(ii) supplying a cylindrical inner flow channel and a cylindrical outer flow channel inside the multi-nozzle section with the main resin for a predetermined time span to form substrate layers, while at the same time, supplying a cylindrical middle flow channel with an intermediate-layer resin coming from another feeder for a certain limited time during this predetermined time span to form the intermediate layer,
(iii) dividing the intermediate-layer resin inside the cylindrical middle flow channel into multiple streams in a circumferential direction,
(iv) joining the circumferentially segmentalized intermediate-layer resin in a manner that the intermediate-layer resin is sandwiched between the substrate layers of the main resin at the confluence to form a laminated molten resin fluid, and
(v) filling a mold cavity with the laminated molten resin fluid.

3. The process for molding the laminated preform according to claim 2, wherein the laminated preform has vertical connecting zones in the given height range, and also has such a laminate structure that narrow horizontal connecting zones having no intermediate layer and having the substrate layers welded directly with each other are formed in parallel in the axial direction and in a plural number along the circumferential direction of the preform and are disposed along upper and lower sides of each intermediate layer segment to be formed, thus allowing the intermediate layer to be segmentalized by both the vertical connecting zones and the horizontal connecting zones in the circumferential direction and in the axial direction, and wherein the intermediate-layer resin is simultaneously supplied from another feeder to the cylindrical middle flow channel, in which the intermediate layer is formed, but is supplied intermittently for a certain limited time during the predetermined time span to have the intermediate layer segmentalized horizontally.

4. The process for molding the laminated preform according to claim 2, further comprising the steps of:
(i) supplying the cylindrical inner flow channel and the cylindrical outer flow channel with a main resin coming from a feeder to form substrate layers,
(ii) supplying the cylindrical middle flow channel with an intermediate-layer resin from another feeder to form the intermediate layer,
(iii) dividing the intermediate-layer resin intermittently in the circumferential direction by means of vertical blocking rib pieces disposed inside the cylindrical middle flow channel, and
(iv) at the confluence, allowing the intermediate-layer resin to flow in such a way as to be sandwiched between the main resin flows respectively coming from the cylindrical inner flow channel and the cylindrical outer flow channel under a circumferentially segmentalized condition so that a laminated molten resin fluid is formed in the joined flow channel,
wherein the injection molding device is an injection molding device to be used to injection mold a laminated preform, which is in a test-tube shape, has substrate layers of a main resin and at least an intermediate layer, and is used in biaxial drawing and blow molding, said injection molding device comprising two resin feeders to feed the main resin and at least a resin for forming an intermediate layer, a multi-nozzle section in which to laminate the main resin with the intermediate-layer resin, and a mold for molding the preform,
wherein the multi-nozzle section comprises at least three layer-forming flow channels:
the cylindrical inner flow channel and the cylindrical outer flow channel form the substrate layers of the main resin,
the cylindrical middle flow channel located between the cylindrical inner flow channel and the outer cylindrical flow channel form the intermediate layer, and
the joined flow channel disposed downstream of at least three layer-forming flow channels and by way of a confluence where molten resins join after having flowed through respective layer-forming flow channels, and
wherein at some points ranging from a given position along the cylindrical middle flow channel to the confluence, a plural number of vertical blocking rib pieces are disposed in parallel in the circumferential direction so as to cross the cylindrical middle flow channel and to divide the flow through the cylindrical middle channel into multiple streams along the circumferential direction.

5. The process for molding the laminated preform according to claim 3, further comprising the steps of:
(i) supplying the cylindrical inner flow channel and the cylindrical outer flow channel with a main resin coming from a feeder to form substrate layers,
(ii) supplying the cylindrical middle flow channel with an intermediate-layer resin from another feeder to form the intermediate layer,
(iii) dividing the intermediate-layer resin intermittently in the circumferential direction by means of vertical blocking rib pieces disposed inside the cylindrical middle flow channel, and
(iv) at the confluence, allowing the intermediate-layer resin to flow in such a way as to be sandwiched between the main resin flows respectively coming from the cylindrical inner flow channel and the cylindrical outer flow channel under a circumferentially segmentalized condition so that a laminated molten resin fluid is formed in the joined flow channel,
wherein the injection molding device is an injection molding device to be used to injection mold a laminated preform, which is in a test-tube shape, has substrate layers of a main resin and at least an intermediate layer, and is used in biaxial drawing and blow molding, said injection molding device comprising two resin feeders to feed the main resin and at least a resin for forming an intermediate layer, a multi-nozzle section in which to laminate the main resin with the intermediate-layer resin, and a mold for molding the preform,
wherein the multi-nozzle section comprises at least three layer-forming flow channels:
the cylindrical inner flow channel and the cylindrical outer flow channel form the substrate layers of the main resin,
the cylindrical middle flow channel located between the cylindrical inner flow channel and the outer cylindrical flow channel form the intermediate layer, and
the joined flow channel disposed downstream of at least three layer-forming flow channels and by way of a confluence where molten resins join after having flowed through respective layer-forming flow channels, and
wherein at some points ranging from a given position along the cylindrical middle flow channel to the confluence, a plural number of vertical blocking rib pieces are disposed in parallel in the circumferential direction so as to cross the cylindrical middle flow channel and to divide the flow through the cylindrical middle channel into multiple streams along the circumferential direction.

6. The process for molding the laminated preform for use in the biaxial drawing and blow molding, according to claim 4, wherein the main resin that forms the substrate layers is supplied from the feeder to the inner flow channel and the outer flow channel at a given pressure or velocity for a predetermined time span, while the intermediate-layer resin is simultaneously supplied from another feeder to the cylindrical middle flow channel for a certain limited time within the predetermined time span to form the intermediate layer.

7. The process for molding the laminated preform for use in the biaxial drawing and blow molding, according to claim 5, wherein the main resin that forms the substrate layers is supplied from the feeder to the inner flow channel and the outer flow channel at a given pressure or velocity for a predetermined time span, while the intermediate-layer resin is simultaneously supplied from another feeder to the cylindrical middle flow channel for a certain limited time within the predetermined time span to form the intermediate layer.

8. The process for molding the laminated preform according to claim 2, wherein a predetermined height range covers a body portion excluding the neck and the bottom of the perform.

9. The process for molding the laminated preform according to claim 3, wherein a predetermined height range covers a body portion excluding the neck and the bottom of the perform.

10. The process for molding the laminated preform according to claim 4, wherein a predetermined height range covers a body portion excluding the neck and the bottom of the perform.

11. The process for molding the laminated preform according to claim 5, wherein a predetermined height range covers a body portion excluding the neck and the bottom of the perform.

12. The process for molding the laminated preform according to claim 6, wherein a predetermined height range covers a body portion excluding the neck and the bottom of the perform.

13. The process for molding the laminated preform according to claim 7, wherein a predetermined height range covers a body portion excluding the neck and the bottom of the perform.

14. The process for molding the laminated preform according to claim 2, wherein the preform has a laminate structure of two resins and three layers comprising a main resin and a gas barrier resin that forms the intermediate layer.

15. The process for molding the laminated preform according to claim 3, wherein the preform has a laminate structure of two resins and three layers comprising a main resin and a gas barrier resin that forms the intermediate layer.

16. The process for molding the laminated preform according to claim 4, wherein the preform has a laminate structure of two resins and three layers comprising a main resin and a gas barrier resin that forms the intermediate layer.

17. The process for molding the laminated preform according to claim 5, wherein the preform has a laminate structure of two resins and three layers comprising a main resin and a gas barrier resin that forms the intermediate layer.

18. The process for molding the laminated preform according to claim 6, wherein the preform has a laminate structure of two resins and three layers comprising a main resin and a gas barrier resin that forms the intermediate layer.

19. The process for molding the laminated preform according to claim 7, wherein the preform has a laminate structure of two resins and three layers comprising a main resin and a gas barrier resin that forms the intermediate layer.

20. The process for molding the laminated preform according to claim 8, wherein the preform has a laminate structure of two resins and three layers comprising a main resin and a gas barrier resin that forms the intermediate layer.

* * * * *